FIG. 16

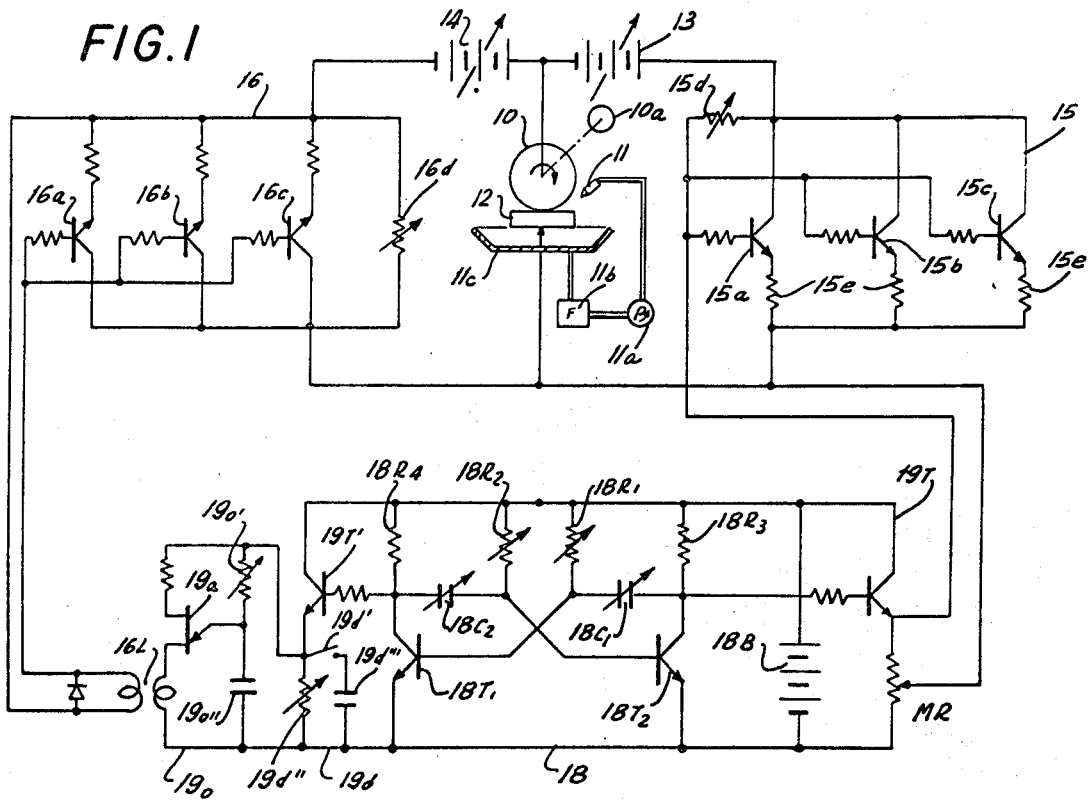
FIG.1
FIG.2A
FIG.2B
FIG.2C
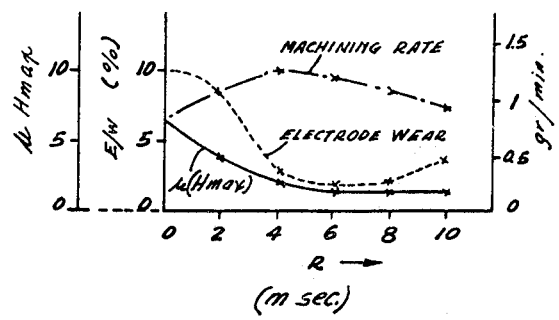
FIG.3
INVENTOR.
KIYOSHI INOUE
BY
Karl F. Ross
Attorney

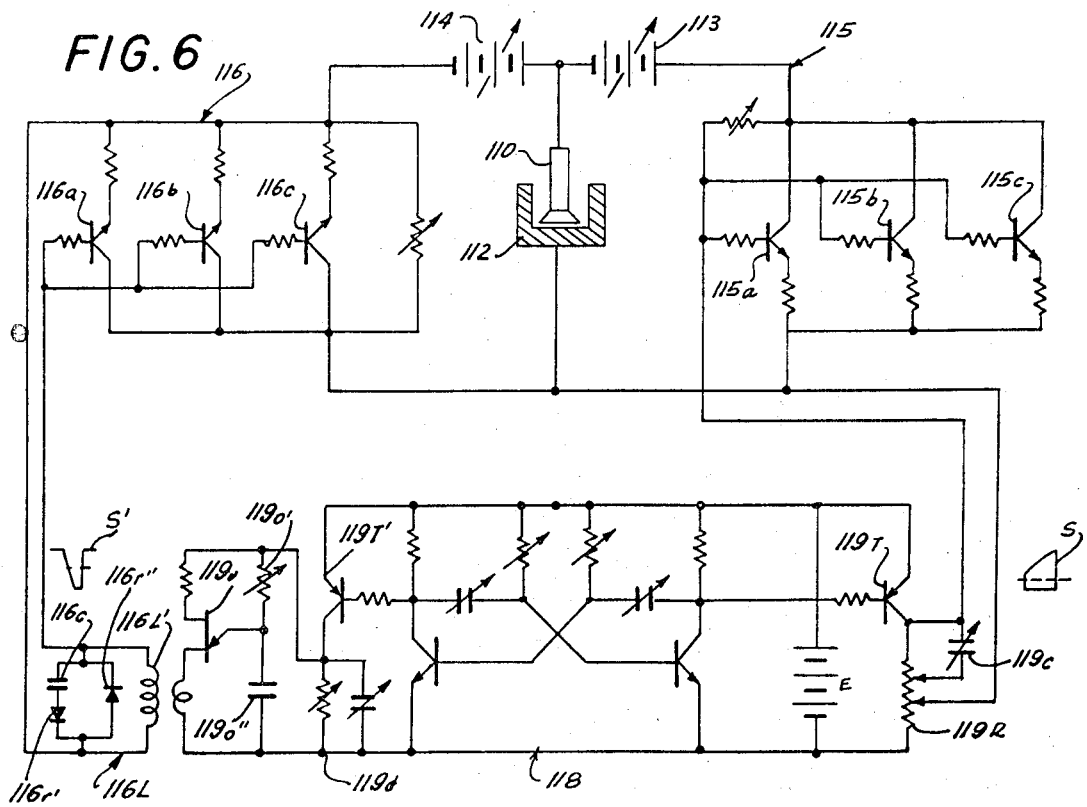
FIG.6
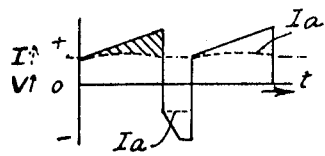
FIG.5A
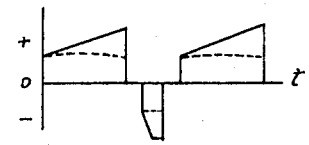
FIG.5D
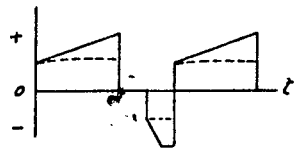
FIG.5B
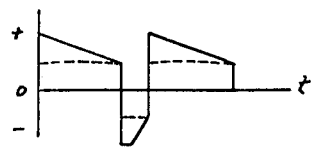
FIG.5E
FIG.5C

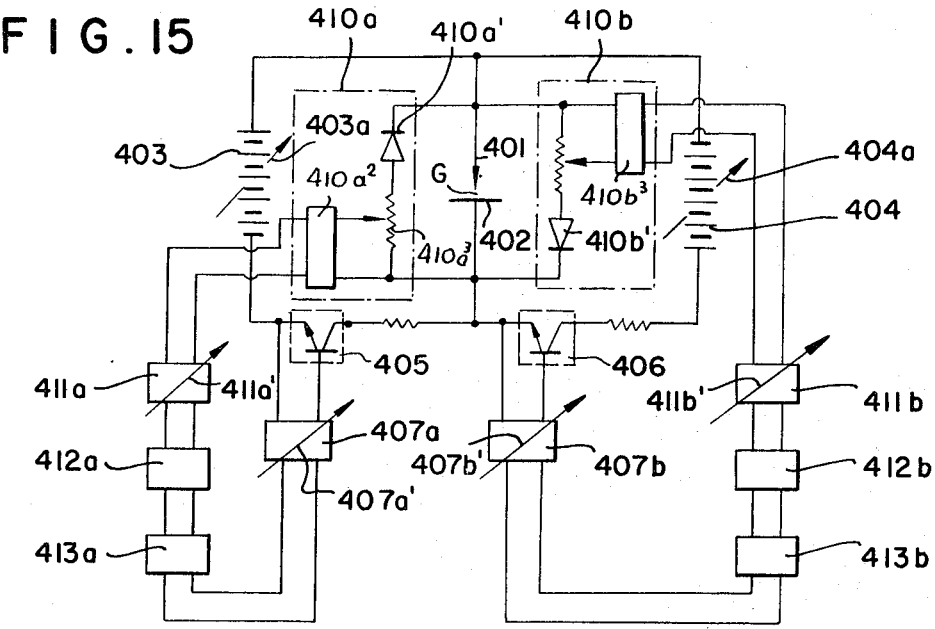
FIG.15
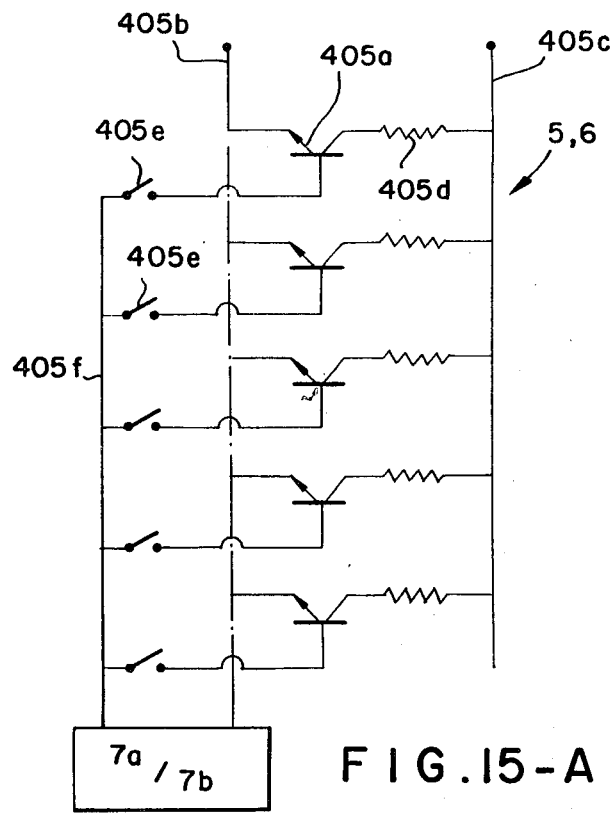
FIG.15-A
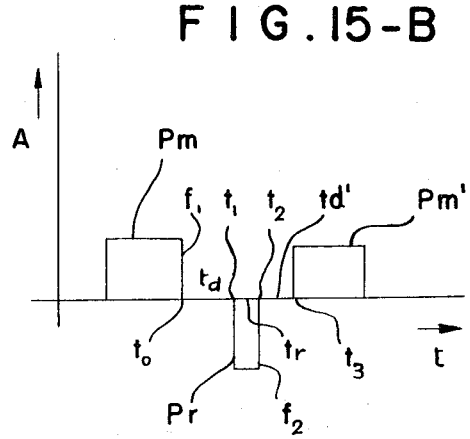
FIG.15-B

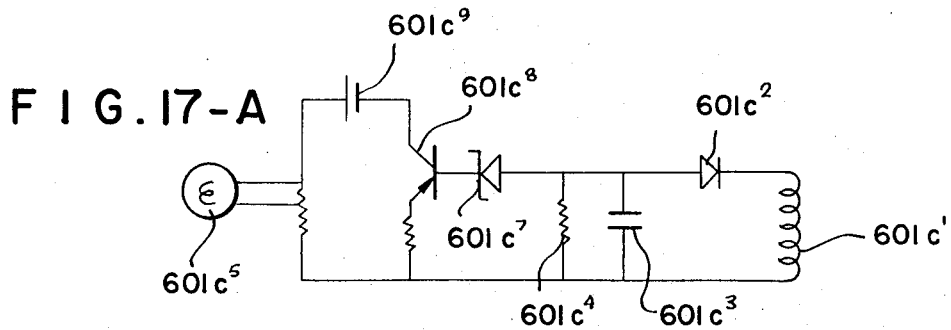
FIG. 17-A
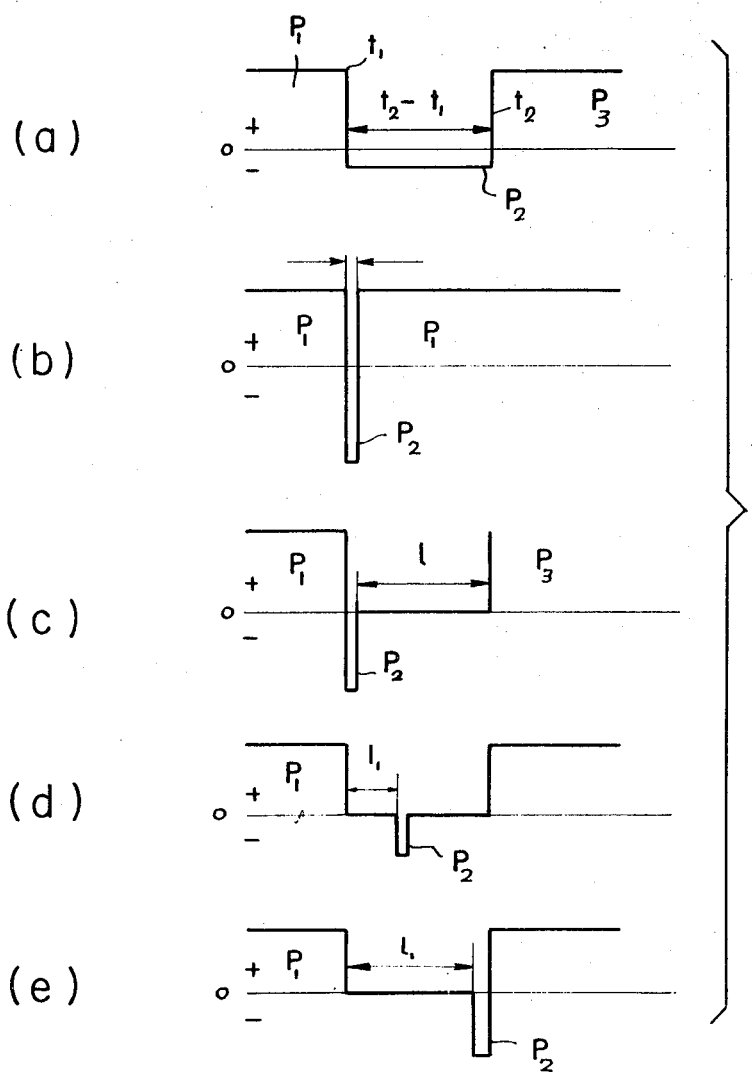
FIG. 20

FIG.19

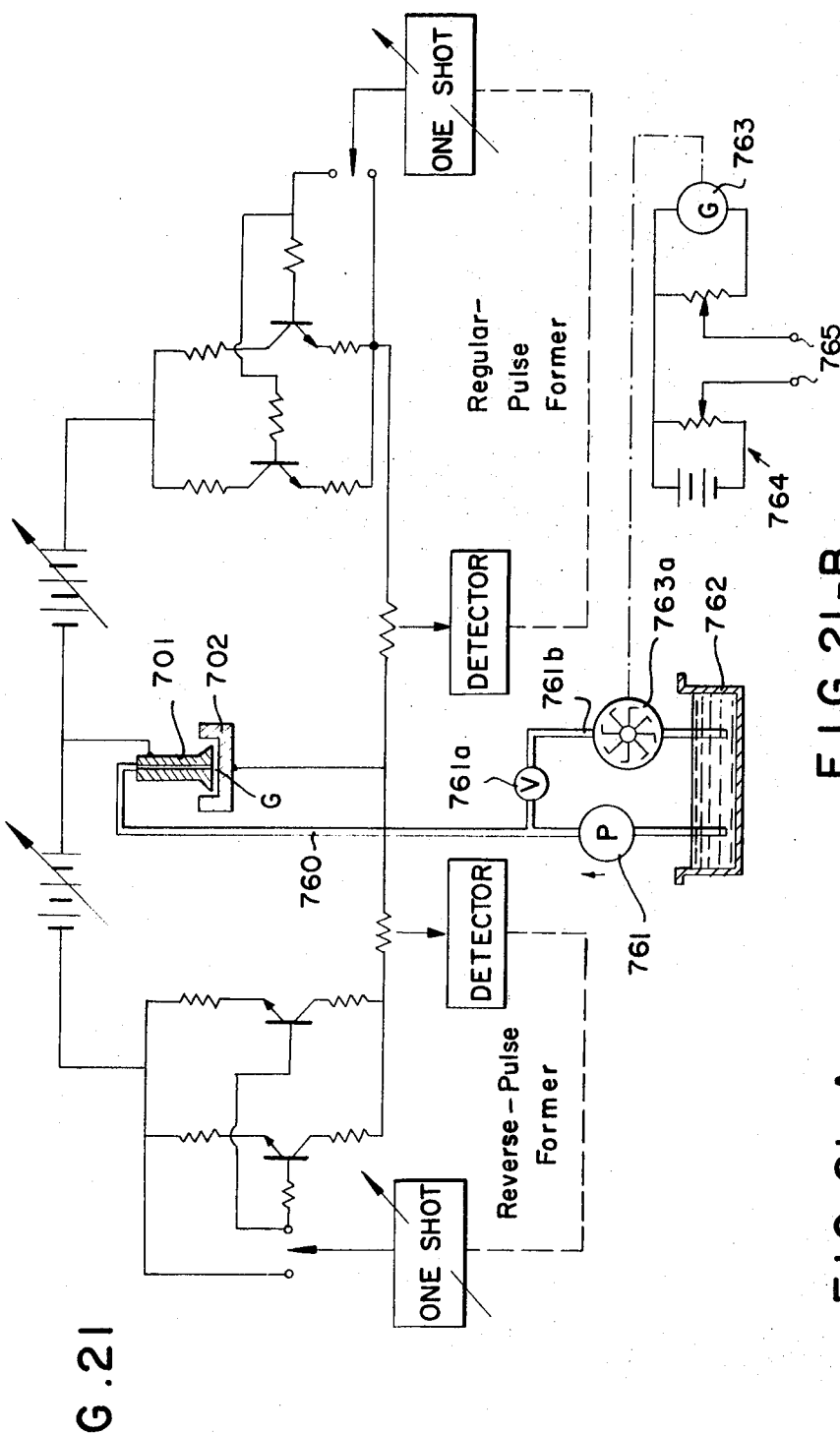
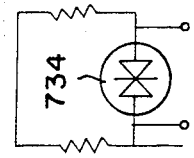
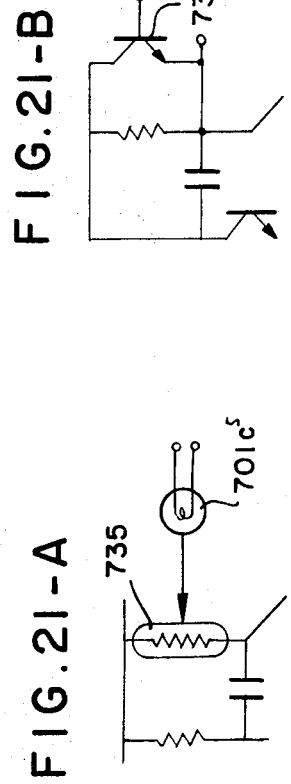
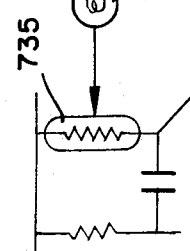

United States Patent Office 3,654,116
Patented Apr. 4, 1972

3,654,116
ADAPTIVE ION-CONTROL SYSTEM FOR
ELECTROCHEMICAL MACHINING
Kiyoshi Inoue, 100 Sakato, Kawasaki, Kanagawa,
Tokyo, Japan
Continuation-in-part of application Ser. No. 714,251,
Mar. 19, 1968. This application Aug. 1, 1969, Ser.
No. 849,261
Claims priority, application Japan, Aug. 7, 1968,
43/55,924; Apr. 19, 1969, 44/30,466
Int. Cl. B23p; C23b 5/76
U.S. Cl. 204—224            29 Claims

ABSTRACT OF THE DISCLOSURE

Method of and apparatus for electrochemically machining a workpiece wherein the machining electrolyzing current passes in the form of steep-wavefront pulses of one polarity spaced by intervals and during these intervals, opposite-polarity pulses are applied across the tool electrode and the workpiece with a pulse width at most equal to the duration of the respective interval but preferably of a shorter duration and with an adjustable lag. Also, adaptive control for electrochemical machining in which passivation conditions in the machining gap is directed by sensing the deviation in an electrical machining parameter, a condition of the electrolyte, or a condition of servo feed of the tool or workpiece toward the other, whereby the reverse-polarity or opposite-polarity pulse has its amplitude, timing and direction adjusted in accordance with the levels necessary to completely eliminate such passivation or ion contamination without unduly increasing tool electrode wear.

CROSS-REFERENCE TO RELATED APPLICATION

This application is a continuation-in-part of my application Ser. No. 714,251 filed Mar. 19, 1968 and entitled "Ion-Control System for Electrochemical Machining."

FIELD OF THE INVENTION

The present invention relates to an ion-control system for electrochemically machining a conductive workpiece and represents a further development of the technique originally described in U.S. Pat. 3,357,912.

BACKGROUND OF THE INVENTION

In that patent, there is described an apparatus for machining a conductive workpiece as well as a method making use of such apparatus wherein the current applied to the machining gap is periodically reversed for depolarization and depassivation of the surfaces of the system.

As observed in that patent, one of the problems arising in electrochemical machining systems is that ion contamination occurs along the surface of the tool juxtaposed with the workpiece and/or the formation of an oxide film along the workpiece. As a consequence, a process termed "passivation" occurs in the electrode gap which must be countered by various means. In the copending application Ser. No. 475,375, filed July 28, 1965 for example, there is described one method of eliminating such passivation whereby spark discharge breaks up a passivating film in a cavity-sinking arrangement, the passivation film being purposely generated to protect portions of the workpiece at which no machining is to occur. In this case, the depassivation or activation of the juxtaposed surfaces of the tool and workpiece makes use of high-energy mechanical electrical shock waves to destroy the film.

Others have pointed out that passivation may be avoided or eliminated by using high-pressure high-velocity streams of electrolyte in a relatively narrow gap. Systems of this latter type have been found inconvenient from the point of view of the hardware necessary to carry out machining under such conditions and the sensitivity of the system to changes in the electrolyte pressure. Vibration has also been proposed as a possible solution to this problem. Furthermore, certain materials are not readily machinable because of their chemical composition by a continuous current system. For example, tungsten carbide requires polarity reversal periodically for optimum machining (see U.S. Pat. 3,357,912). In substantially all systems which have provided periodic reversal of the electrolytic machining current, there is applied out-of-phase A.C. or pulsating D.C. signals in superimposition upon the machining current so that the machining current waveform and the reversal wave form both may be considered generally sinusoidal or at best rounded with nonsteep leading and trailing flanks. Only the amplitude of the machining signals and the reverse signals can be adjusted in these devices.

Apart from the foregoing considerations, it may be pointed out that, in recent years, attention has increasingly been directed to so-called "adaptive control" of machining operations. Earlier efforts to apply adaptive control techniques to electrochemical machining systems have tended toward unsatisfactory results because of the large number of parameters involved. For example, electrochemical machining requires movement of the workpiece and the electrode toward one another, either under the control of a servomechanism responsive to the conditions of the machining gap or continuously carried out the electrolyte changes in pressure and flow rate at various portions of the gap as well as in composition and temperature, the machining current and voltage varies with ion contamination, passivation, changes in electrolyte characteristics and variations in gap width, etc. It has, therefore, been long sought to provide true adaptive control for electrochemical machining (ECM systems).

It may also be pointed out that many of the power supply arrangements of earlier types for electrochemical machining have not had sufficient versatility to accommodate adaptive control and were incapable both of optimally removing passivation films and the like, and of allowing machining at a high rate with minimum tool wear.

OBJECTS OF THE INVENTION

It is the principal object of this invention to provide a system for the electrochemical machining of a conductive workpiece, especially composite (e.g. tungsten-carbide workpieces which are difficult to machine) which give rise to an improved machining rate, better machining accuracy and decreased passivation at the gap.

Another object of the present invention is to provide a system of the character described which can be used without difficulty for different materials whose optimum machining parameters may differ.

Another object of the instant invention is to provide a system which extends the principles originally set forth in my application 714,251 and is capable of adaptive control of an electrochemical machining process.

A further object of the instant invention is to provide a highly versatile power supply and control system (circuit arrangement) which permits ready adjustment of the opposite-polarity (reverse-polarity) pulses to obtain maximum depassivation and minimum tool wear.

Still another object of this invention is to provide an adaptive control system capable of responding to one or more parameters of the machining process to optimize the parameters by suitable correction, the systems being relatively simple and unaffected by many of the events which have been found detrimental to earlier control systems of the same general type.

SUMMARY OF THE INVENTION

These objects and others which will become apparent hereinafter, are attained in accordance with the present invention which provides a power supply for delivering a series of machining pulses to the electrode and workpiece with an intervening interruption of the signal, a reversal pulse being applied during such reversal and having essentially steep or square-wave flanks which are adjustable with respect to the timing and correlation with the trailing edge of a prior machining pulse and the leading flank of the following machine pulse. It has surprisingly been found that when the reversal pulse has its leading flank substantially coincident with the trailing flank of the machine pulse, the machining process is most effective with iron bodies; however, when tungsten bodies are machined, best results are obtained when the trailing edge of the reversal pulse coincides with the leading edge of the subsequent machining pulse. The machining of copper and copper-zinc alloys by the electrochemical method of the present invention is best carried out with a reversal pulse substantially midway between the machining pulses.

Accordingly, there is provided a power supply with solid-state switching devices and control both the machining-pulse duration and the interpulse interval duration, and reversing switching means for generating a narrow pulse (pulse width less than the interval width) with adjustable timing so that the initiation of the reversal pulse can be simultaneous with termination of a machining pulse or may be delayed with respect to termination of a preceding machining pulse or may terminate concurrently with initiation of a subsequent machining pulse in dependence upon the material to be machined. It has been found that a power supply for this purpose best comprises a number of parallel-connected solid-state switching devices (e.g. transistors) in series with a D.C. source and the machining system, two such circuits being provided with D.C. sources oppositely poled for generating the machining pulses and the reversal pulse respectively.

According to a more specific feature of this invention, a multivibrator timing circuit is provided for alternately activating and deactivating the respective sets of switching transistors via amplifying transistors or the like, preferably tied to a timing constant network establishing the pulse duration. Between the outlet of the multivibrator and the parallel-connecting switching transistors assigned to the negative pulse train, there is provided a controllable time-delay network whose time constant can be reduced to zero but which otherwise establishes a lag between cut-off of the machining pulse and initiation of the reversal.

As noted earlier, a further but related discovery in connection with depassivation of the electrochemical machining system is that steep-flank substantially square wave signals at the machining region provide a sharp increase in the accuracy of the machining operation as determined by reproducibility of the electrode or tool shape in the workpiece. As a practical matter, even though a square wave pulse is applied across the electrode and the workpiece, it is found that pasivation films develop during the single machining pulse at a relatively high rate causing a decrease in the current during the passage of each machining pulse. The resulting current versus time plot of the waveform shows a sloping rounded shape as the passivation film develops, this shape being repeated in the machining pulses of the train as a consequence of reformation of the passivation film after each reversal pulse. It has been found that the effects of such passivation films during the passage of the machining pulse can be reduced sharply by shaping the machining pulse to constitute it as a variable signal changing substantially at the rate of formation of the passivation film and adapted to maintain the current across the machining gap substantially constant.

When reference is made herein to electrochemical machining and the presence of a machining gap, it must be understood that these expressions include electrochemical grinding wherein as described in the copending application Ser. No. 512,338 filed Dec. 8, 1965 (now U.S. Patent No. 3,475,312) and then-pending application Ser. No. 562,857 (now U.S. Pat. No. 3,420,759), filed July 5, 1966, every effort is made to urge the electrode tool against the surface of the body to be machined. Various principles of the power supply system described above have also been applied in my copending applications Ser. No. 511,827 (now U.S. Patent No. 3,527,686) and 682,824 (now U.S. Patent No. 3,539,755), filed Dec. 6, 1965 and Nov. 14, 1967, respectively. The waveform-shaping network for the machining-voltage pulses and the reversal pulses (if necessary) may be inductive or capacitive impedances, L–C differentiating or integrating networks or simply R–C pulse shapers.

According to a more specific feature of the present invention, an electrical machining power supply arrangement, which can also be used for electroplating, electrophoretic coating and other systems using the principles of electrolysis where ion contamination and passivation of an electrode are encountered, has a pair of sensing means respectively responsive to the positive and negative pulses applied to the interelectrode gap for detecting the termination of these pulses respectively and producing an output signal which, after a delay established by a delay means in the form of delay line, relaxation oscillator or other electronic delay element, the period of which is adjustable to establish the desired interpulse interval, triggers a pair of electronic switching elements for applying pulses of opposite polarity from a common source or from separate sources via respective monostable multivibrators corresponding to the sense of electronic switching elements. The direction of each pulse, i.e. of machining polarity or reverse polarity, is established by the adjustable time constant of the monostable multivibrator, whereas the interpulse interval is, as indicated, established by the adjustable time constant of the delay line or other delay network.

In an adaptive control arrangement, according to the present invention, passivation at the machining gap and/or ion contamination may be detected as a function of the movement of the tool electrode relative to the workpiece. When reference is made here to the movement of the tool electrode relative to the workpiece, it must be borne in mind that either of these members can be movable while the other is fixed and both can be movable differentially or in opposite directions if desired. Throughout this description, therefore, when reference is made to the movement of the tool electrode it is also intended to encompass movement of the workpiece electrode as well. For example, it is common practice to move the electrode when large surface areas are being machined, generally with movement of the tool electrode traversely to itself, or when boring, the sinking and drilling is carried out, but the workpiece is often moved (and the tool electrode held fixed), when deburring or the like occurs. Consequently, neither the drawing nor the description is to be considered limited to movement of the electrode while the workpiece is held stationary or vice versa, although for the sake of convenience, the electrode has most often been shown to be movable. It has already been pointed out that it is a common practice in one type of electrochemical machines to provide a servomechanism responsive to conditions at the gap and, therefore, the rate of removal of the workpiece material, to advance the electrode to maintain a constant gap spacing. It has now been found that the rate of such electrode movement is substantially inversely proportional to the degree of passivation and ion contamination which hinder further machining.

Thus, in accordance with an important aspect of this invention, the depassivation pulses and the pulse circuit generating same are controlled by the rate of movement of the tool electrode. The importance of this feature may be visualized when it is recognized that, although one can theoretically determine the optimum timing, interval and amplitude of the depassivation or reverse polarity pulse, the actual gap conditions often completely eliminate the utility of such optimal parameters. Thus presetting of the parameters of the reverse polarity pulses has been found to be disadvantageous, inasmuch as it is unable to eliminate excessive depassivation, and ion contamination, and frequently results in greater tool wear. These insufficient responses of preset reverse polarity systems have the further disadvantage that any failure to completely remove passivation films permits further buildup during subsequent machining pulses and eventually results in a total breakdown of the machining operation.

It has also been pointed ot earlier that some electrochemical machining systems operate with a constant electrode feed, the desired gap being maintained by controlling the machining current in accordance with changes in the gap conditions, thereby increasing the machining rate as the gap tends to become smaller and decreasing the machining rate as the gap tends to increase in width, with continuous feed of the electrode. In this system there is provided a detection means responsive to the change in the electrical conditions of the gap fostered by passivation and the increased machining current necessary to compensate therefor. In general, therefore, means responsive to the degree of passivation is provided to detect the rate of formation of the passivation film to control at least one of the power supplies, e.g. the power supply producing the reverse-polarity or the power supply applying the machining polarity current to the gap.

It has also been found to be advantageous to detect the development of passivation conditions in the gap, and control the pulse generating and control means of the machining system in accordance therewith, by using parameters of the electrolyte or the like as will be apparent hereinafter.

DESCRIPTION OF THE DRAWING

The above and other objects, features and advantages of the present invention will become more readily apparent from the following description, reference being made to the accompanying drawing in which:

FIG. 1 is a circuit diagram of an apparatus embodying the present invention;

FIGS. 2A–2C are wave-form diagrams showing the preferred current/time relationship for the machining and reversal pulses of the present invention;

FIG. 3 is a graph representing the results obtained with a specific example of the invention;

FIGS. 5A–5E show the improved wave forms of the present invention;

FIG. 6 is a circuit diagram of another arrangement in accordance with this invention;

FIG. 15 is a block diagram of a system embodying this invention wherein a pair of pulse detectors are responsive to the pulses applied to the gap to trigged further pulses with adjustable time delay in accordance with the present invention;

FIG. 15A is a circuit diagram of the switching elements used in the circuit of FIG. 15;

FIG. 15B is a diagrammatic representation of the pulses produced by this circuit;

FIG. 16 is a circuit diagram of some of the blocks of FIG. 15;

FIG. 17A is a circuit diagram of a modification of the system of FIG. 17;

FIG. 19 is a circuit diagram of the latter, illustrating only portions pertinent to a detailed discussion of the system;

FIG. 20 is a diagram of the pulses produced by the systems of FIGS. 18 and 19;

FIG. 21 is a block diagram of a system using another form of adaptive control;

FIGS. 21A and 21B are circuit diagrams showing various modifications of the circuitry thereof;

SPECIFIC DESCRIPTION

Figure 7:
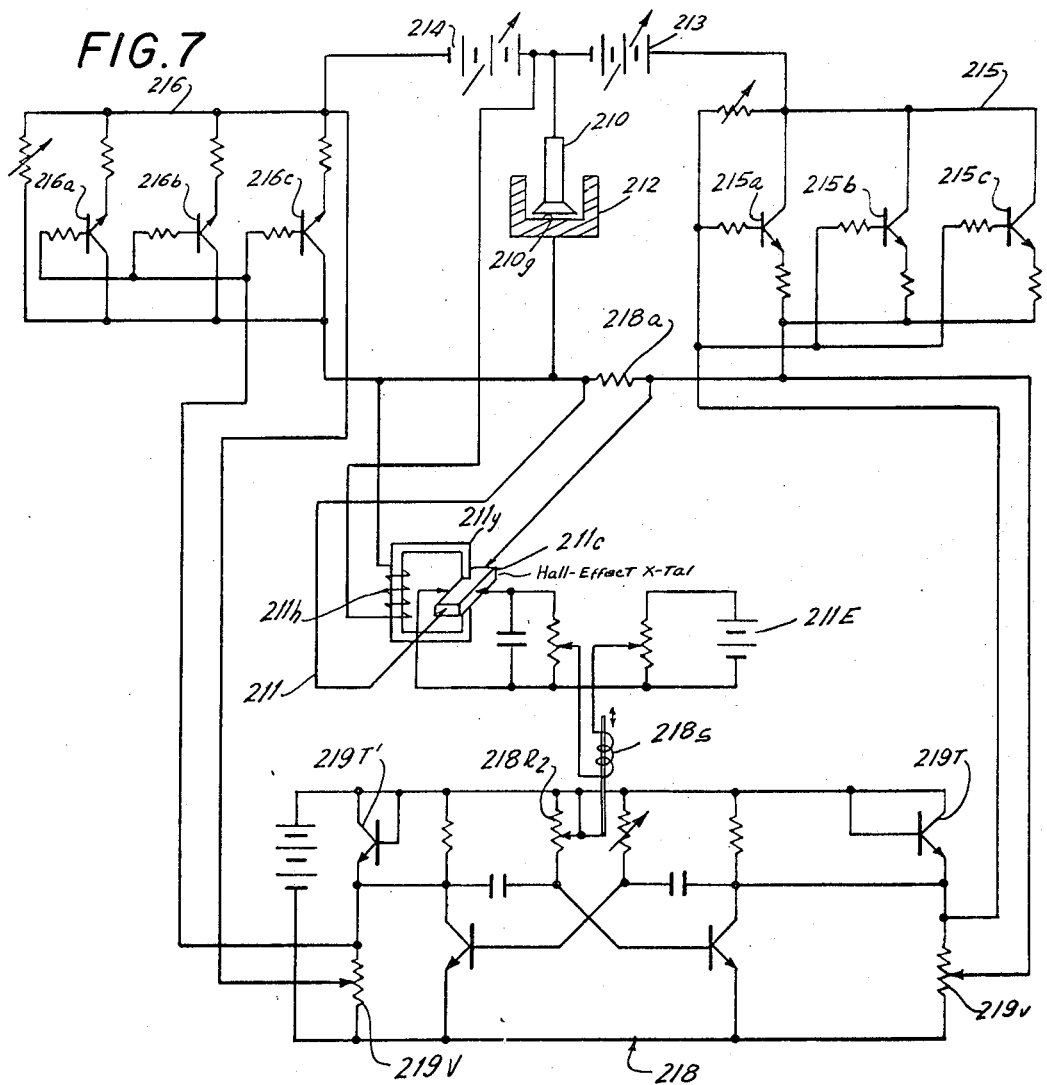
FIG. 7 is a diagram of a further system using improved feedback.

In FIG. 1, I show a circuit for operating an electrochemical grinding apparatus of the general type described in U.S. Pat. 3,420,759, and having a contoured sheet 10 composed of graphite or the like and driven by a motor 10a. The electrolyte is supplied to the interface between the electrode 10 and the metallic workpiece 12 by a nozzle 11 supplied with the electrolyte by a pump 11a from a filter 11b and a collecting vessel 11c. It will be understood, however, that the present invention applies equally to electrochemical cavity sinking and tap removal, to electrochemical machining using rodlike or elongated electrodes, etc.

In accordance with the present invention, the machining pulse is delivered across the machining gap by a first series circuit constituted by an adjustable D.C. source 13, and a bank of switching transistors 15. In this system, the switching transistors 15a, 15b and 15c have their emitter-collector branches connected in parallel with one another between the battery 13, one terminal of which is connected to the tool electrode 10, and the workpiece 12 so that, when transistors 15a and 15c are rendered conductive, they apply the positive pulse (FIGS. 2A–2C) serving for the principal machining operation. The bases of transistor 15a–15c are connected via the usual biasing resistor to the emitter terminal of a NPN transistor 19T whose function will be described in greater detail hereinafter. An adjustable bias resistor 15d establishes the base-collector bias while resistors 15e establish the emitter collector bias for the transistor 15a–15c.

The negative pulse is generated by a switching network 16 in series with an adjustable D.C. source 14 between the electrode 10 and the workpiece 12, the sources 13 and 14 being poled oppositely to one another. Here, the transistors 16a–16c have the emitter-collector terminals in parallel and bridged by a bias resistor 16d and are energized via biasing resistors at their base terminals from the output 16L of a multivibrator power supply and timer. In accordance with this invention, a multivibrator network 18 is provided with a pair of transistors $18T_1$ and $18T_2$ cross-coupled via adjustable resistors $18R_1$, $18R_2$ and adjustable capacitors $18C_1$ and $18C_2$ in conventional flip-flop configuration, the switching device being energized by the battery 18B. Output or load resistors $18R_3$ and $18R_4$ are also provided.

The output signal of the multivibrator developed across $18R_3$ has a duration $T(+)=kR_1C_1$ which represents the duration of the positive pulse where $k$ is a constant and $R_1$ and $C_1$ represent the resistance and capacitance of the resistor $18R_1$ and $18C_1$, respectively. This signal energizes the output transistor 19T to apply a further signal across the voltage-dividing resistor 19R and thereby trigger the transistors 15c for the duration of the machine pulse, the RC network $18R_1$, $18C_1$ thereafter switching the multivibrator 18 to block transistor 19T.

The signal developed across resistor $18R_4$, whose duration is represented by the relationship $T(-)=k'R_2C_2$ (where $R_2$ and $C_2$ are the resistance and capacitance of members $18R_2$ and $18C_2$, respectively) triggers the output transistor 19T'. This transistor energizes a unijunction-transistor timer 19o via a delay network 19d which may be cut out entirely by the switch 19d'. The delay network comprises an adjustable resistor 19d'' in parallel with a capacitor 19d'''. After an adjustable delay period determined by the time constant of this network, the unijunction oscillator 19o is energized to provide an output at the transformer 16L to trigger the switching circuit 16 for a period determined by the constancy of the relaxation network 19o', 19o'' which are, respectively, a variable resistor connected between the emitter and one base of the unijunction transformer 19u and a capacitor connected between the emitter and the other base of the unijunction transformer 19u and a capacitor connected between the emitter and the other base of the unijunction transistor.

FIGS. 2A–2C illustrate several waveforms which have been found satisfactory for the machining of iron-tungsten carbide and copper or copper-zinc alloys, respectively. In each of these figures, the amplitude of the current ($\pm I$) is plotted along the ordinate against time as abscissa. The duration of the positive pulse is represented at $T(+)$ while the interval between the positive pulses is indicated at $T(-)$. At a delay period D or D' (FIGS. 2B and 2C) which may equal zero (FIG. 2A) determined by the network 19d, the reversal pulse is generated by the switching network 16 for a period R where, in accordance with an essential feature of this invention $R<T(-)$ and $R+D<T(-)$. Preferably D is about 20 msecs.

EXAMPLE I

Using the apparatus in FIG. 1 a tungsten carbide workpiece containing 6% by weight cobalt was electrochemically ground in an aqueous potassium nitrate (5% by weight) electrolyte over a machining area of 1.6 cm.² using the waveform represented in FIG. 2B and a delay period D of 20 msecs. The results obtained are plotted in FIG. 3. The electrode was composed of graphite.

In FIG. 2A, the duration R of the negative pulse in msecs. is plotted along the abscissa while three separate ordinate plots represent the ratio of electrode to workpiece wear in percents, the roughness of the machining surface in $\mu$(Hmax.) and the machining rate in g./min. The machining rate is represented as a dot-dash line while the electrode wear is shown by broken lines and the surface roughness in solid lines. When $R=0$ (corresponding to no reversal of current and merely a 20 msec. interruption), the ratio of electrode wear to workpiece wear ($E/W$) is about 10% while the surface roughness is about $6\mu$(Hmax.) and the machining rate is approximately 0.8 g./min. with a negative spike of a duration of 3 to 5 msecs., the machining rate is raised to substantially 1.2 g./min. while the electrode wear is reduced to its minimum of about 2% ($E/W$) while the surface roughness is reduced to about $0.2-1\mu$(Hmax.). Thereafter, the electrode wear increases, the machining rate falls while the surface roughness remains substantially constant. Surprisingly, as R approaches $T(-)$, analogous to the waveform used in U.S. Pat. 3,357,912, the electrode wear rises sharply, the surface roughness remains constant or increases slightly depending upon the materials used and the machining rate falls off sharply as well. Furthermore, the sharper the wavefronts of the signal, the greater is the reproducibility of the machining process and the reproduction of the machining surface. Waveforms of the type shown in FIGS. 2A and 2C are most suitable for use with iron and steel workpieces and with copper and copper-zinc alloys, respectively.

As noted earlier, it has been found that even during the positive pulse, the passivation film may impede machining or distort same. Thus, in FIGS. 4A and 4B, there is plotted the voltage applied by a square-wave generator with intervening reversal along the ordinate against time along the abscissa while the current is likewise represented in broken lines. The voltage is shown in solid lines. It has already been pointed out that, preferably, the machining current waveform should be a square wave. However, the square wave is precluded by formation of the passivation film which, although the voltage maintains its square-wave form, assumes a sawtooth-like configuration with machining current loss as represented by hatching in FIGS. 4A and 4B.

In both cases, the broken lines represent the actual machining current while the dot-dash line represents the preferred current level for the machining operation. The effects of the passivation film, which appears to reform at each machining pulse (FIG. 4A) or forms substantially automatically and then is destroyed during the machine pulse (FIG. 4B), can be obviated by shaping the machining pulse so as to impart to the current waveform a compensation designed to regenerate the substantially square waveform mentioned earlier.

Figures 4A, 4B:
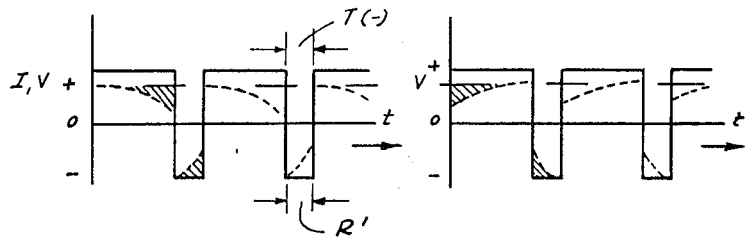
FIGS. 4A and 4B represent the relationship between voltage and current and the effects of passivation films.

Typical shaped waves, according to the present invention, are represented in FIGS. 5A–5E. FIG. 5A, for example shows a waveform which compensates for the passivation effect illustrated in FIG. 4A. In this system, a pulse shaping is effected to provide a gradual increase in the voltage with time substantially at the rate necessary to compensate for the current decrease with time shown in FIG. 4A. The resulting current waveform (dotted line $I_a$ in FIG. 5A) thus has the square-wave configuration indicated to be desirable. The application of these principles to the waveforms shown in FIGS. 2A and 2B are subjected to passivation effects as represented in FIG. 4A so that here, too, it is preferred to provide pulse shaping as described in connection with FIG. 5A. The results of such pulse-shaping are shown in FIGS. 5B and 5C. The application of the principle to the system of FIG. 2C is represented in FIG. 5D. The same pulse-shaping principle may be used to decrease the voltage of FIG. 5E so that the passivation film is destroyed rapidly and a square-type wave configuration is imparted to the current flow when the problem of FIG. 4B is encountered.

FIG. 6 shows a device generally similar to that previously described but allowing waveform shaping as indicated. In the system of FIG. 6, the tool electrode 110 is a cavity-sinking member co-operating with the workpiece 112 and supplied with electrolyte through the electrode via the means described in U.S. Pat. 3,357,912. A machining pulse is applied across the workpiece/electrode gap from the D.C. source 113 connected in series with the emitter-collector branches of parallel-connected transistors 115a, 115b and 115c of a solid-state switching assembly 115. The negative pulses are provided by a D.C. source 114 in series with the emitter-collector terminals of transistors 116a, 116b, 116c of another switching assembly 116. At the output side of the multivibrator trigger 118, which is constructed and operates as described in connection with FIG. 1, there is provided the PNP output transistor 119T whose collector lies in series with the voltage dividing resistor 119R. To form the sawtooth voltage waveform represented at FIG. 5A, there is provided a waveform-shaping impedance (e.g. variable capacitor 119C which is chargeable at a rate determined by the time constant of the network 119C, 119R) to provide a pulse shape as shown at S and trigger the switching transistors 115A, 115B, 115C accordingly. As a consequence, a substantially square-wave machining pulse is applied across the machining assembly 110, 112. In place of a capacitive impedance, an inductive impedance may be employed to provide the required pulse shape (FIG. 5E).

The other output of the multivibrator 118 is delivered to the base of the output transistor 119T' which is of the PNP type and is provided in its collector circuit with a delay network 119d whose function has been described earlier. The resistor 119o' and the capacitor 119o" control the "on"-time of a unijunction transistor 119u which is transformer-coupled with the switching transistor assembly 116 as previously described. The output winding 116L' of the transformer 116L forms an inductance which, together with a pair of oppositely poled rectifiers 116r' and 116r" and a capacitor 116c form an integrating circuit of spikelike output as represented at S'. The spike has a sufficient pulse height so that the passivation film is rendered ineffective and a square-wave pulse is generated during the negative portion of the cycle as well (FIGS. 5A–5D).

According to a further feature of this invention, the reversing pulse is delivered and the machining pulse is terminated when the machining power during each pulse falls to a predetermined level indicative of a film buildup to the point that power losses become substantial. Accordingly, a feedback is provided for the timing network which adjusts the interval between machining pulses, whether or not the reversing pulse width is coincident therewith, thereby triggering at least an interruption of the machining signal and generally also a reversal when the power delivered to the system during the machining pulse has in part been dissipated by predetermined buildup of the passivating film. In this embodiment, the multivibrator timer 218 has a variable resistor $218R_2$ forming part of a time-constant network for controlling the interval $T(-)$ between machining pulses.

As represented in this figure, the wiper of the potentiometer is shiftable by a servomotor, here represented as a solenoid coil 218s. The power-detection system includes a resistor 218a in series with the workpiece, the machining gap 210g and the electrode 210 across the D.C. source 213 and the switching transistor assembly 215. The transistors 215a, 215b and 215c have their emitter-collector networks connected in parallel between the source 213 and resistor 218a. Also across the electrode 210 and the workpiece 212, there is provided a tap which serves as a feedback of the voltage to the coil 211h of a Hall-effect assembly 211.

A yoke 211y applies a magnetic field perpendicularly to the Hall effect crystal 211c so that the magnetic field is proportional to the amplitude of the voltage applied across the machining device. A second tap across the shunt resistor 218a passes an electric current through the crystal in a crystal plane perpendicular to the magnetic field while the output voltage is tapped perpendicularly to both the magnetic field and the proportional current and is applied across a temporary storage capacitor 211c to the voltage-dividing resistor 211r.

The reference voltage is supplied by a battery 212E and is compared with the voltage developed at resistor 211h by the coil 218a connected in a bridge circuit with the wipers of these variable resistors. The negative pulse generator comprising the variable source of direct current 214 is connected in series with the tool 210 and with the parallel-connected emitter-collector networks of the transformers 216a, 216b and 216c of the switching circuit 216. In this system, the output transistors 219T and 219T' control the voltage tapped from the voltage dividers 219v, 219V to regulate the duration of the positive pulse and the intervening pulse. Since the transistor switch 216 is energized directly (i.e. without a delay network or the unijunction transistor timing ciricuit), the negative pulse is coextensive with the interval between machining pulses (see FIG. 4A or 4B); however, the regenerative feedback from the Hall-effect crystal to the servomotor 218s adjusts the period $T(-)$ as well as the pulse width R' as represented in FIG. 4A. When the film builds up more rapidly, the power variation (resulting from decreasing current while the applied voltage remains constant) will be detected rapidly and reversal initiated when the current amplitude falls off to the predetermined minimum level. The unijunction timing network for the negative pulse (FIG. 1), the capacitive pulse shaping networks (FIG. 6) and the LC integrating circuit 116L etc. (FIG. 6) are all compatible with the feedback system illustrated in FIG. 7 and it may be employed in conjunction therewith.

Figure 8:
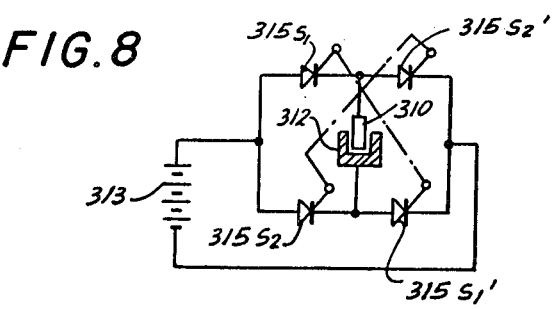
FIGS. 8, 9 and 10 represent other circuits of energizing the electrochemical machining system of the present invention.

FIGS. 8–11 represent other circuit arrangements for controlling the spacing between the terminal flank of the machining pulse and the forward flank of the reversal pulse, the gap width, etc. In FIG. 8, the system comprises a D.C. source 313 whose positive terminal is connected in series with a solid-state controlled rectifier $315S_1$, the electrode 310 and workpiece 312, a correspondingly poled solid-state controlled rectifier $315S_1'$ and a negative terminal of the battery. A similar series circuit adapted to effect current flow in the opposite direction, is formed by the positive terminal of battery 313, the solid-state controlled rectifier $315S_2$, the workpiece 312, the electrode 310, the solid-state controlled rectifier $315S_2'$ and the negative terminal of the battery.

Figure 10:
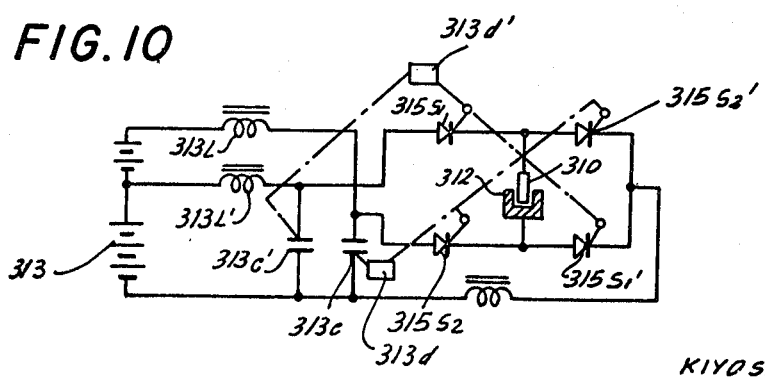
Figure 9:
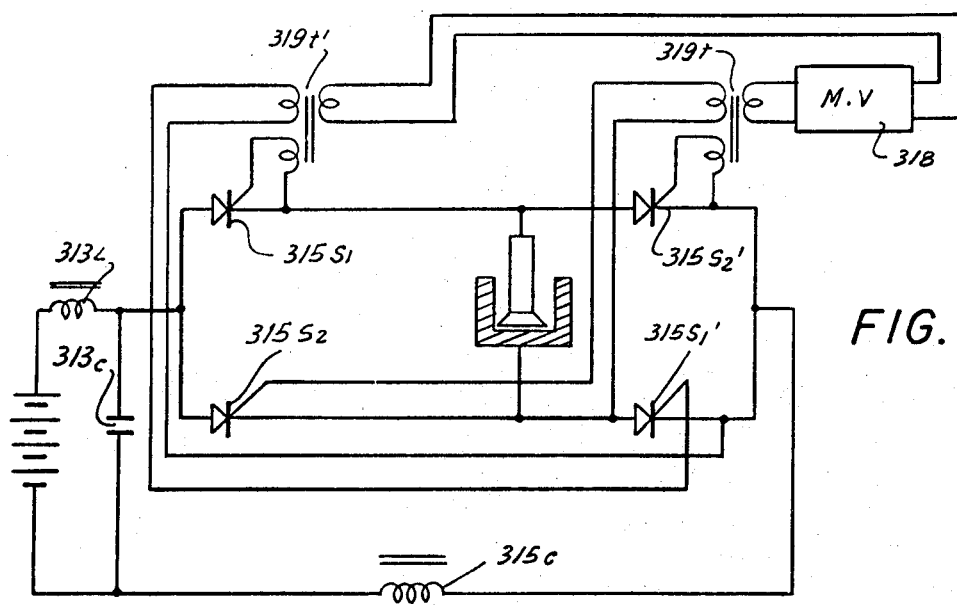
Figure 11:
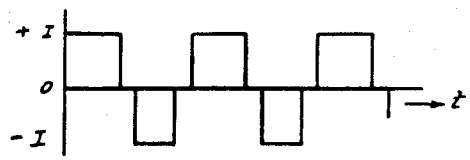
FIGS. 11 and 12 are waveform diagrams resulting from the circuits of FIGS. 8–10.
Figure 12:
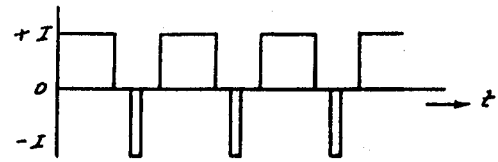

The gates of the series-connected rectifiers are tied for cross operation in alternation as represented by the dot-dash line (e.g. via a multivibrator); thus the sets $315S_1$ and $315S_1'$ and $315S_2$, and $315S_2'$ are triggered alternately. When a gap is provided between a switchover of the conduction of the 2 sets, current wave forms such as those shown in FIGS. 11 and 12 are attainable. FIG. 9 shows a system wherein the power supply includes a pulse shaping choke 315c between a storage capacitor 313c and its surge-suppressing choke 313L. The choke 315c facilitates quenching of the controlled rectifiers $315S_1$, $315S_1'$, $315S_2$ and $315S_2'$ after these controlled rectifiers have been triggered by the multivibrator 318. In this system, the multivibrator alternately operates a pair of transformers 319t and 319t' each having two secondary windings. The secondary windings are connected with the respective gates of the corresponding set of controlled rectifiers to ensure that both controlled rectifiers of each set will be simultaneously energized. In the modification of FIG. 10, a pair of inductive-capacitive networks is provided at 313L, 313c and 313L', 313c' bridged across the D.C. source 313. A charge-level detector 313d and 313d' is provided to detect the level of charge at the capacitors 313c and 313c' and, upon the charge level attaining a predetermined value, triggering the controlled rectifiers $315S_1$, $315S_1'$ and $315S_2$, $315S_2'$ to discharge the respective current surge through the controlled rectifiers and across the machining gap. The capacity, charge and discharge times determine the values of $T(+)$, $T(-)$, R and D.

Figure 13:
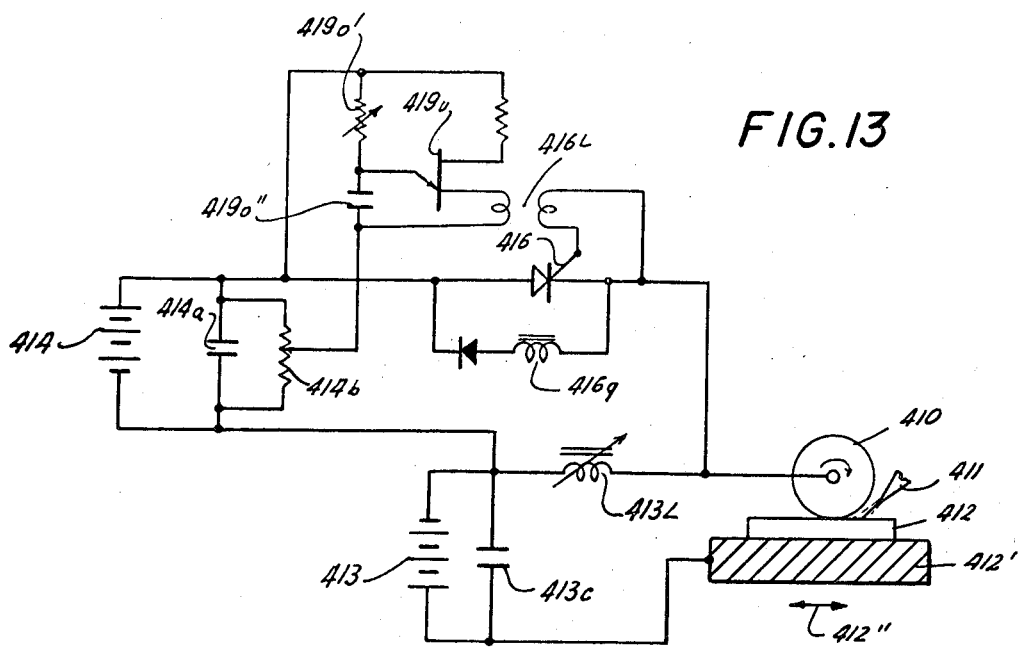
FIG. 13 is a circuit diagram of another power supply embodying the present invention.
Figure 14:
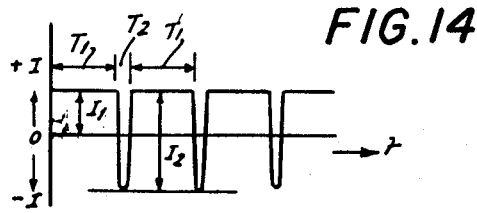
FIG. 14 is a wave diagram of the machine pulses produced with this system.

FIG. 13 shows an electrochemical machining circuit operated on principles analogous to those described in connection with FIG. 7 wherein, however, the interruption of the machining pulse and the coincidental application of the reversing parts results from superimposing a negative spike upon a continuous D.C., the spike amplitude being in excess of the continuous-current amplitude. Thus, the apparatus comprises a graphite electrochemical grinding wheel 410 which machines a workpiece 412 with electrolyte being delivered to the interface at 411, the workpiece 412 being shifted upon a table 412' in the direction of arrow 412" in a surface-grinding arrangement. A continuous D.C. source 413 is connected in series with a surge-suppressing choke 413L and is bridged by a D.C. blocking capacitor 413c while being connected across the electrode 410 and the workpiece 412. The source 413 delivers a machining current of an amplitude $I_1$ to the machining system (see FIG. 14). The pulse circuit includes a source 414, poled oppositely the source 413 and bridged by a D.C. blocking capacitor 414a and a voltage divider 414b tapped to energizing the relaxation network 419o' and 419o" which, in turn, controls a unijunction transsitor 419u whose output transformer 416L triggers a controlled rectifier 416. A rectifier and inductance network 416q, quenches the controlled rectifier to extinguish the reversing pulse. The unijunction transformer network controls the duration ($T_2$) of the negative pulse whose amplitude ($I_2$) exceeds $I_1$.

EXAMPLE II

Using the circuit of FIG. 13, a tungsten carbide workpiece containing 3% by weight cobalt is machined with a graphite wheel driven at a speed of 3000 r.p.m. and having a diameter of 8". The electrolyte is a 5% aqueous solution of potassium nitrate supplied at a rate of about 4.5 liter/min. The mean current delivered to the machining system was 60 amp./cm.$^2$ and the amplitude $I_1$ was half the pulse amplitude $I_2$. The machining rate was measured at various ratios of machining current "on" time ($T_1$) to machining current "off" time ($T_2$). With a ratio $T_1/T_2$ of 1, machining was carried out at about 0.8 g./min. at a ratio $T_1/T_2$ switched between 2, 3, 4 and 5, the machining rate rose from 1.2 to 1.7 and then reduced to 1.3 and 0.8 g./min., respectively. Optimum machining was carried out with a system in which the machining current "on" time was three times the "off" or reversal pulse time. Best results were found with current density between 10 amp./cm.$^2$ and 300 amp./cm.$^2$.

In FIG. 15 of the drawing, there is shown a control and power circuit for the machining electrode 401 and the workpiece 402 which is somewhat more versatile than the systems described previously. Furthermore, it provides a basis for adaptive control as will become apparent hereinafter. In this block diagram, the electrode 401 and the workpiece 402 are shown diagrammatically to form between them a machining gap G, the electrode 401 being generally advanced toward the workpiece for drilling, boring, die sinking and like operations, although the relative movement between the electrode 401 and the workpiece 402 can also be effected by moving the workpiece, for example, for electrochemical deburring.

The power pulses are produced by a source 403 which, as represented by the arrow 403a, is adjustable to establish the amplitude of the machining-current pulses. The source 403 is connected in series with a NPN transistor bank 5 via the collector-emitter network thereof across the workpiece 402 and the electrode 401. The electronic switch 405 represents a bank of power transistors as shown in greater detail in FIG. 15A. In the latter figure, five power transistors 405a are provided, the common bus bars 405b and 405c being connected respectively to the emitter and collector of each transistor, the latter via the bias resistors 405d. Switches 405e in series with each of the base electrodes of the transistors, are tied to a common line 405f which may be triggered and which will be apparent hereinafter to render these transistors conductive. The current delivered to the gap 401G, 402 will thus depend upon the number of the power transistors 405a connected in parallel with one another and collectively in series (i.e. in a bank) between the first D.C. source 403 and the gap.

Machining current pulses, as opposed to the reverse-polarity pulses mentioned previously, are supplied by a further D.C. source 404 which is adjustable as represented at 404a to apply any desired voltage level across the gap in series with a transistor bank represented at 406 and constituted as described in connection with FIG. 15A. Here again, the number of transistors of the bank in parallel with one another establishes the peak current of the pulse delivered by the source 404 to the gap G.

Detectors 410a and 410b are connected across the machening gap for sensing the termination of the regular polarity pulse of the second source 404 and the termination of the reverse polarity pulse supplied by the source 403 respectively. Each of these detectors comprises a diode 410a and 410b poled opposite one another, so as to pass only opposite polarity pulses, respectively, in series with the voltage dividing resistor 410a and 410b. The potential drop across each of these resistors is applied to a differentiating transformer and amplifying network represented generally at 410a and 410b, respectively, but shown in greater detail in FIG. 16.

From these pulse detectors, which respond to the leading flanks of the peaks of the pulses initiated by the opposing power supply, the detected signals are applied to delay networks 411a and 411b which are adjustable as shown at 411a' and 411b'. These delay networks are, of course, settable independently of one another and establish, as will be apparent hereinafter, the intervals between the reverse polarity pulse and the main machining pulse. From the delay networks 411a, 411b, the signals are supplied to wave-shaping networks such as the Schmitt triggers 412a and 412b from which differentiating circuits 413a and 413b are energized. The differentiating network, in turn, triggers a one-shot or monostable multivibrator 407a, 407b which has an adjustable time constant as represented by the arrows 407a', 407b', to enable the electronic switch bank 405 or 406 triggered thereby to remain conductive for predetermined periods.

The Schmitt trigger networks 412a and 412b may be of the type described at pages 389–402 of "Pulse, Digital and Switching Waveforms," Millman & Taub, McGraw-Hill Book Co., New York, 1965. The multivibrators 407a and 407b, in turn, may be monostable multivibrators as described at 406–431 of "Pulse, Digital and Switching Waveforms," op. cit.

The operation of the circuit of FIG. 15 will be readily apparent from a consideration of the pulse train of FIG. 15B. In this figure there are shown two machining pulses $P_m$, $P_m'$, between which appears a reverse polarity pulse $P_r$, time being plotted along the abscissa while amplitude is plotted along the ordinate. It will be apparent, therefore, that the diode 410a' passes a change in potential represented by the vertical flank $f_1$ of a prior machining pulse $P_m$ and immediately triggers at $t_0$ the delay network 411a which stores the signal for a period $t_d = t_1 - t_0$. Upon the termination of this interval, which is adjustable by setting the delay network 411a as represented by arrow 411a', the signal has passed through the Schmitt trigger 412a to the differentiator 413a to trigger the monostable multivibrator 407a at $t_1$. The latter unblocks the transistor bank 405 and connects the reverse polarity source 403 across the workpiece and tool electrode to produce the opposite polarity pulse $P_r$ for a duration $t_r = t_2 - t_1$. Upon decay of the square-wave pulse $P_r$, the flank $f_2$ is detected through the diode 410b' and is manifested in a voltage drop across the resistor 410b, thereby communicating a signal to the delay network 411b at which the interval $t_d$ is established prior to energization of the Schmitt trigger, the differentiator 413b and the monostable multivibrator 407b to unblock the transistor bank 406 and produce at $t_3$ (where $t_d' = t_3 - t_2$), the next machining pulse $P_m$.

Figure 16:
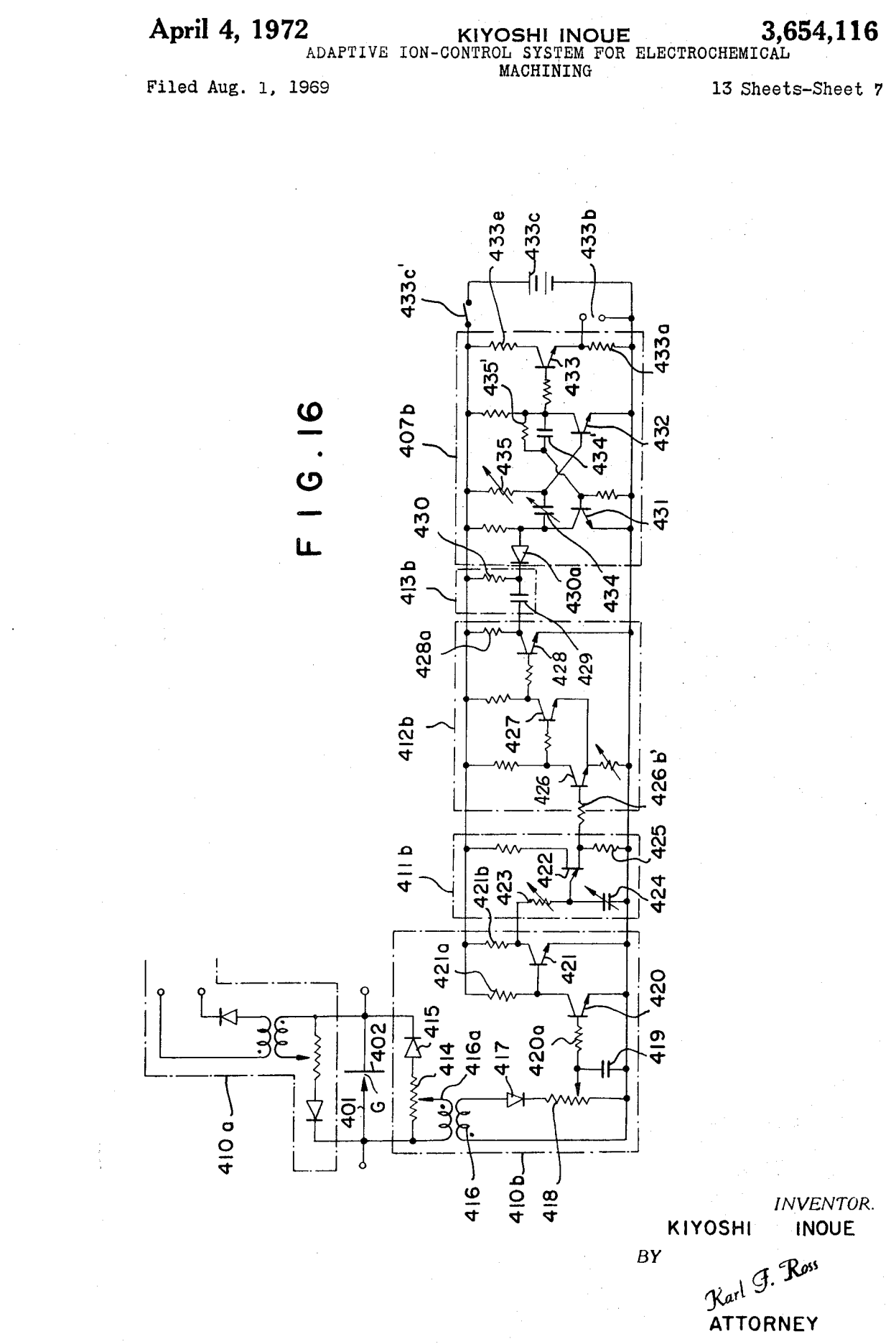

In FIG. 16, there is shown a circuit diagram of one of the detection networks in accordance with the present invention, i.e. the network 410b, 411b, 412b, 413b and 407b, the corresponding network 410a–407a being of a similar construction. The high ohmic resistor 410a' or 410b' shown in FIG. 15 is here indicated at 414 and lies in series with a rectifying diode 415 whose orientation is such that it permits only reverse polarity pulses to produce a voltage rise across the portion of the resistor 414 tapped at 416a by the primary winding of a transformer 416 constituting part of the detecting network in series with a secondary winding of the transformer 416 is a further rectifying diode 417 and resistor 18, the former being oriented to provide a voltage drop across the resistor 418 only upon termination of the reverse-polarity pulse. The detected signal is applied to and stored in a capacitor 19 which forms a discharge circuit with a portion of resistor 418 but is connected through a base-bias resistor 420a to the base or control electrode of a NPN transistor 20 to render the latter conductive upon the buildup of a potential at the terminal of the electrode 419 connected to the base of transistor 420.

The collector electrode of transistor 420 is connected to the base of an amplifying transistor 21 whose base-collector network is provided with the bias resistors 421a and 421b. As long as transistor 20' is conductive in response to the termination of the reverse-polarity pulse, transistor 21 is held nonconductive to generate a voltage drop across its collector-emitter network.

The delay network 411b responds to this potential which is tapped from between the emitter and the collector, e.g. via the control network of a relaxation oscillator having a unijunction transistor or a double base diode 422. The control electrode 428, i.e. its rectifying terminal, is tied between a resistor 423 and a variable capacitor 424 and the network is, in turn, bridged across the collector-emitter network of transistor 421. Thus as transistor 421 is returned to a nonconductive state in response to termination of a reverse polarity pulse across the machining gap, capacitor 424 is charged via resistor 423 for a duration determined by the adjustable charging time constant of this network. This charging time, of course, establishes a delay period controlled by the variable capacitor 429 and the variable resistor 423.

Capacitor 429, thereupon discharged as the unijunction transistor 424 becomes conductive to generate an output pulse across the resistor 425 as the capacitor discharges therethrough, this output pulse being applied across the base and emitter electrode (via resistors 426a and 426b) of transistor 426 which constitutes part of the Schmitt trigger 412b and acts as a waveform shaper as transistor 426 is brought into its conductive state the conjugate transistor 427 is brought to a blocking condition to develop the potential necessary to render transistor 428 conductive and produce an output pulse at 428a across the output resistor which is of rectangular configuration.

This rectangular pulse is subjected to differentiation in the R-C differentiating network 413b (whose resistor 430' is joined to the capacitor 429 at the junction of a rectifier diode 430a with the network). The result is a differentiated signal in the form of a sharp trigger pulse which is applied to the input of the monostable multivibrator 407b which, in turn, generates a rectangular signal pulse across the output terminals 433b of resistor 433a in series with a battery 433c, a circuit on/off switch 433d, the collector-bias resistor 433e and the emitter collector network of a transistor 433, the latter acting as an intermediate amplifier. The monostable multivibrator 407b comprises a pair of oppositely disposed NPN transistors 431, 432, the basis of which are cross-coupled via time constant networks 434, 435 which is adjustable and 434', 435' which is not. Terminals 433b apply the trigger signal to the basis of the transistors of the transistor bank 406 as previously described. The rectangular regular polarity machining pulse is thus produced. The time constant of the monostable multivibrator is adjustable at 434, 435 to determine the duration of the pulse at the output resistor 433a. It will be appreciated that the other network 410a etc. operates in a similar manner so that one network responds to the termination of the pulse produced by the other to eventually generate its own pulse and thereupon cause the second network to respond to the latter pulse prior to initiation of its own.

In accordance with other principles of the invention to be elucidated below, the settable members 434, 435 may be replaced by transducers or the like responsive to a particular machining parameter and adaptively modifying the duration of the machining pulse and the duration of the reverse polarity pulse in accordance with changes in gap conditions. In this case, a delay network such as has been shown at 411b may be avoided.

Figure 17:
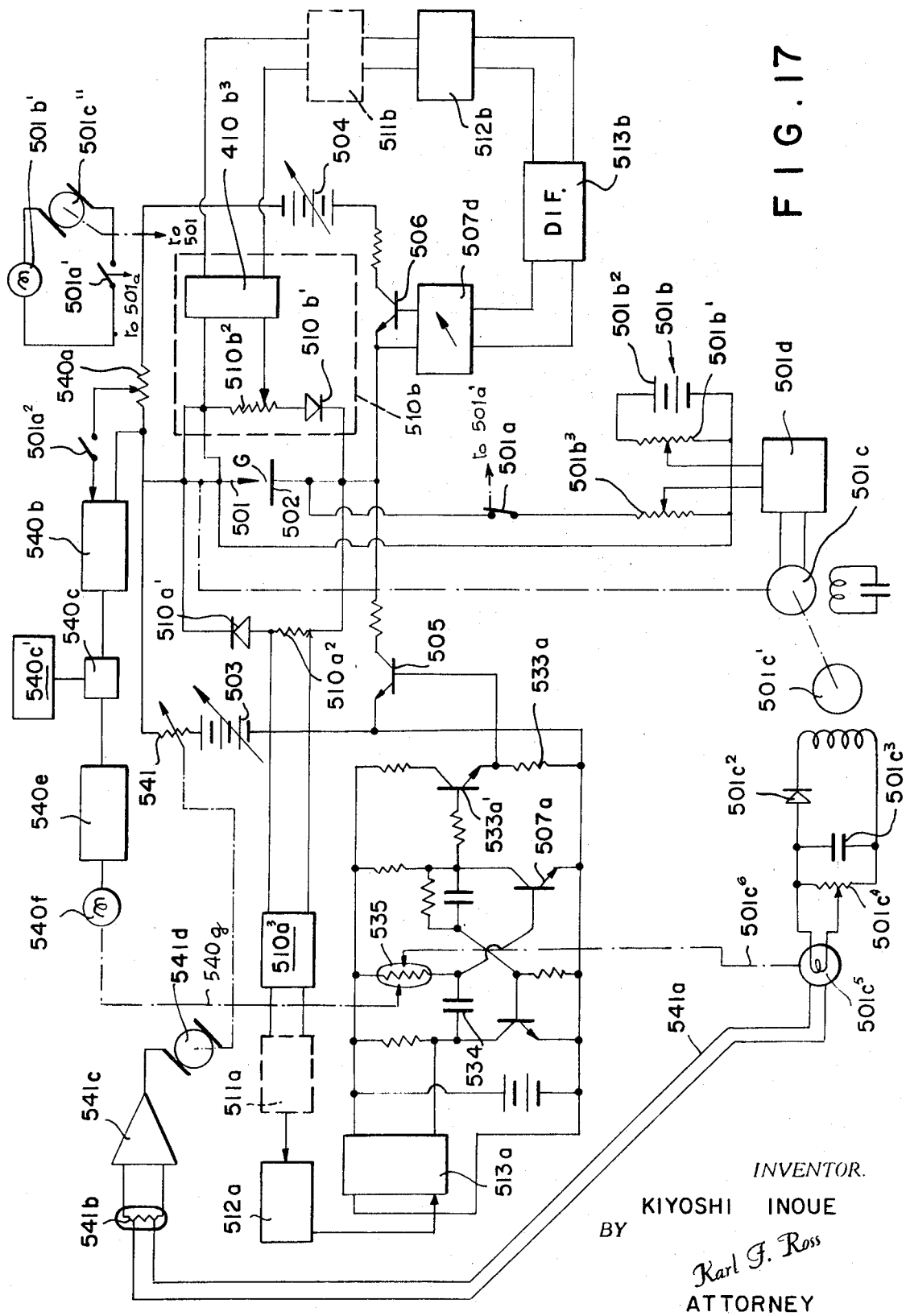
FIG. 17 is a partial block diagram of an adaptive control system according to this invention.

FIG. 17 shows an adaptive control system using the principles discussed in connection with FIGS. 15 and 16. More specifically, it has been found that, because of continuous variation in the condition of the gap during machining operation, material removal and the degree of passivation following each machining pulse will vary. Thus, it is found that the amplitude and/or duration of negative pulses (opposite-polarity pulses), which must be minimized to limit wear, may be insufficient to completely decontaminate the gap and remove the passivation film. Consequently, residual passivation film or contamination will hinder material removal during subsequent machining pulses. As a consequence, the electrode is brought into contact with the workpiece when it is fed continuously or ceases to advance when it is under the control of a servomechanism.

In accordance with the principles of this aspect of the invention, the rate of passivation or the passivation conditions in the gap are detected by using the fact that the rate of advance of the tool electrode with respect to the workpiece under the control of a servomechanism is proportional to the passivation or contamination development. In other words, there is provided a rate generator which responds to the rate of electrode feed under servo-control and, in turn, controls a circuit similar to that of FIG. 15 or FIG. 16, to compensate for any changes by varying the duration of the respective pulse. When a constant electrode feed is used, the changes in the electrical parameters or the fluid parameters of the gap are capable of indicating the development of a passivation condition and, in accordance with the principles of this invention, are used to control the reverse pulse parameters in a manner similar to that described in connection with servomechanism arrangements.

In the embodiment of FIG. 17, the tool electrode is shown at 501 and the workpiece at 502. A switch 501a serves to connect the feedback network 501b for a servomotor 501c driving the electrode 501 to the servo-amplifier 501d for advancing the electrode 501 when switch 501a is closed.

Alternatively, a switch 501a' may be closed to connect an electric current source 501b' to a constant-speed motor 501c which, upon closure of switch 501a, is rendered operative. Switches 501a and 501a' are coupled together so that they are operable alternatively but not together. Connected across the tool electrode 501 and the workpiece 502, which together define the machining gap G, is the reverse-polarity pulse detector network 510b with a rectifier 510b$^1$ and a resistor 510b$^2$ in series with one another and in parallel across the machining gap. The signal tapped from the variable resistor 510b$^2$ and delivered to the pulse-forming network, as represented diagrammatically at 410b$^3$ (the circuit of which is shown in FIG. 16), is passed, if desired, to a delay network 511b and thence to a Schmitt-trigger circuit 512b before feeding the differentiator 512b, the trigger pulse of which is applied to a one-shot monostable multivibrator 507d of the character previously described. The monostable multivibrator, in turn, operates the electronic switch bank 506 which is similar to that shown in FIG. 15A, to connect the main machining source 504 with the electrodes 501, 502.

When constant feed of the electrode 501 by motor 501c' is contemplated, the gap resistance will fall should the gap become excessively small and the current will increase. This change in the electrical parameter of the gap is sensed by a resistor 540a in series with the electrodes 501, 502, the source 504 and the electronic switch 506. The signal tapped from resistor 540a is delivered to a detector, e.g. an amplified as represented at 540b, is compared at 540c with a reference or threshold level introduced at 540d so that a control signal may be generated at 540e to establish the duration of the main or reverse current pulses to minimize passivation as will be apparent hereinafter.

The servomechanism of this invention comprises a detector 501b and the amplifier 501d which develops the error signal, uses the latter to control the servomotor 501c as mentioned earlier. The amplifier 501d receives a reference potential from a potentometer 501b$^1$ connected across a battery 501b$^2$, while the control signal is delivered through a resistor $501b^3$, the tap of which is connected to the other side of the amplifier $501d$.

A tachometer or rate generator $501c^1$ is coupled with a servomotor $501c$ to produce an output proportional to the rate of rotation and thus proportional to the passivation of the electrode gap. Tachometer-rate generators of the type which may be used in accordance with the present invention are described at pages 315–332 of Ahrendt & Savant's Servomechanism Practice, McGraw-Hill Book Co., Inc., second edition, 1960.

The output of the rate generator $501c^1$ is applied to an integrating network formed by a diode $501c^2$ and a sistor $501c^4$ across which a lamp $501c^5$ is tapped. This continuous filament lamp is used in the alternative with lamp $540f$ of the control-signal generator $540e$, to establish the duration of the reverse current pulses.

As described in connection with FIGS. 15 and 16, a detector $510a$ is connected across the electrode $501$ and the workpiece $501$ and has a resistor $510a^2$ in series with the rectifier diode $510a^1$, the resistor being tapped by the network $510a^3$ and, if desired, feeding the delay network $511a$, the Schmitt trigger $512a$ and a differentiating network $513$. The monostable multivibrator $507a$ is here provided with a photoresistive or photoconductive cell $535$ in place of the resistor $435$ which was manually controllable. Fiber optical systems may be used at $540g$ and at $501c^6$. Best results are obtained with lead sulfide, cadmium sulfide or zinc sulfide cells.

The output from the multistable multivibrator $507a$ appears across the resistor $533a$ of the last stage transistor $533$ and is used to render transistor bank $505$ conductive to apply the reverse-polarity source $503$ across the electrodes $501$, $502$.

During material removal, the tool electrode is advanced toward the workpiece at a rate determined by the servomotor $501d$. Lamp $501c^5$ (assuming switch $501a$ is closed and switches $501a^1$ and $501a^2$ are open) emits light of a maximum intensity in response to the increase output signal appearing at the detecting network $501c^2$ and $501c^3$, thereby holding the resistance at $535$ to a level such that the negative pulse duration is just sufficient to eliminate passivation caused by the normal machining pulses. When, however, the rate of material removal decreases as a consequence of increased passivation and ion contamination in the gap, the rate of servofeed is correspondingly reduced to maintain the gap spacing. Consequently, a reduced output appears at $501c^2$ and $501c^3$ so that less light is emitted from the lamp and the resistance of the photoconductor $535$ increases in inverse proportionality to the reduced rate of advance of the electrode, thereby increasing the duration of the reverse polarity pulses and eliminating the more excessive passivation film. When the power feed ceases completely, as a consequence of the build up of passivation film, the reverse pulses are of large duration to promptly eliminate such passivation. The system eventually provides substantial power feed under servocontrol and produces highly precise machining of the workpiece.

The input network to the photoconductive resistor $535$ may also be provided as shown in FIG. 17. In this embodiment, the pick up coil $601c^1$ of the rate generator is connected across the integrating capacitor $601c^3$ and a diode $601c^2$. At the junction between the diode and the capacitor $601c^4$ is provided. In place of a simple resistor, there can be provided a Zener diode $601c^7$ which becomes conductive only when the voltage across resistor $601c^4$ reaches a predetermined threshold at which the lamp $601c^5$ becomes responsive to the light.

A transistor $601c^8$ is connected in series with a battery $601c^9$ to deliver illuminating current. It may be noted, moreover, that the output signal of lamp $501c^5$ or $601c^5$ may be used for control for the pulse amplitude of the reverse pulse train. To this end, an impedance which may be varied in inverse proportionality to the magnitude of the output signal, can be provided in the power circuit forming the reverse pulses. A rheostat $541$ performs this function in the embodiment of FIG. 17, the rheostat being connected in series with the opposite-polarity source $503$. A fiber-optical connection may be made at $541a$ between the lamp $501c^5$ and a photoconductor $541b$ controlling an amplifier $541c$ which, in turn, drives a motor $541d$ for operating the potentiometer $541$.

EXAMPLE III

A tool electrode composed of copper was used for the electrochemical machining of workpieces composed of tungsten carbide/cobalt alloy, stainless steel (18–8 chromium-nickel stainless steel), high carbon steel and iron with an aqueous electrolyte containing 15% by weight potassium nitrate. The electrolyte was supplied through the electrode through the machining gap at a pressure of 5 k./cm.$^2$. Machining efficiency was tested and the optimum ratio of negative pulse to positive pulse determined for the respective workpiece materals. With an electrolyte temperature in excess of 60° C., the ratio of positive pulses to negative pulses should be 9:1 to 9:2 for tungsten carbide/cobalt alloy, for stainless steel the preferred ratio of 6:1 to 6:2.5 (with electrolyte tmeperature above 60° C. For high-carbon steel in separate tests ratios of 3:1 to 3:1.5 and 10:$\approx$1 were satisfactory, and for iron the preferred ratio at electrolyte temperature of 60° C. was found to be 10:$\approx$1.2.

Figure 18:
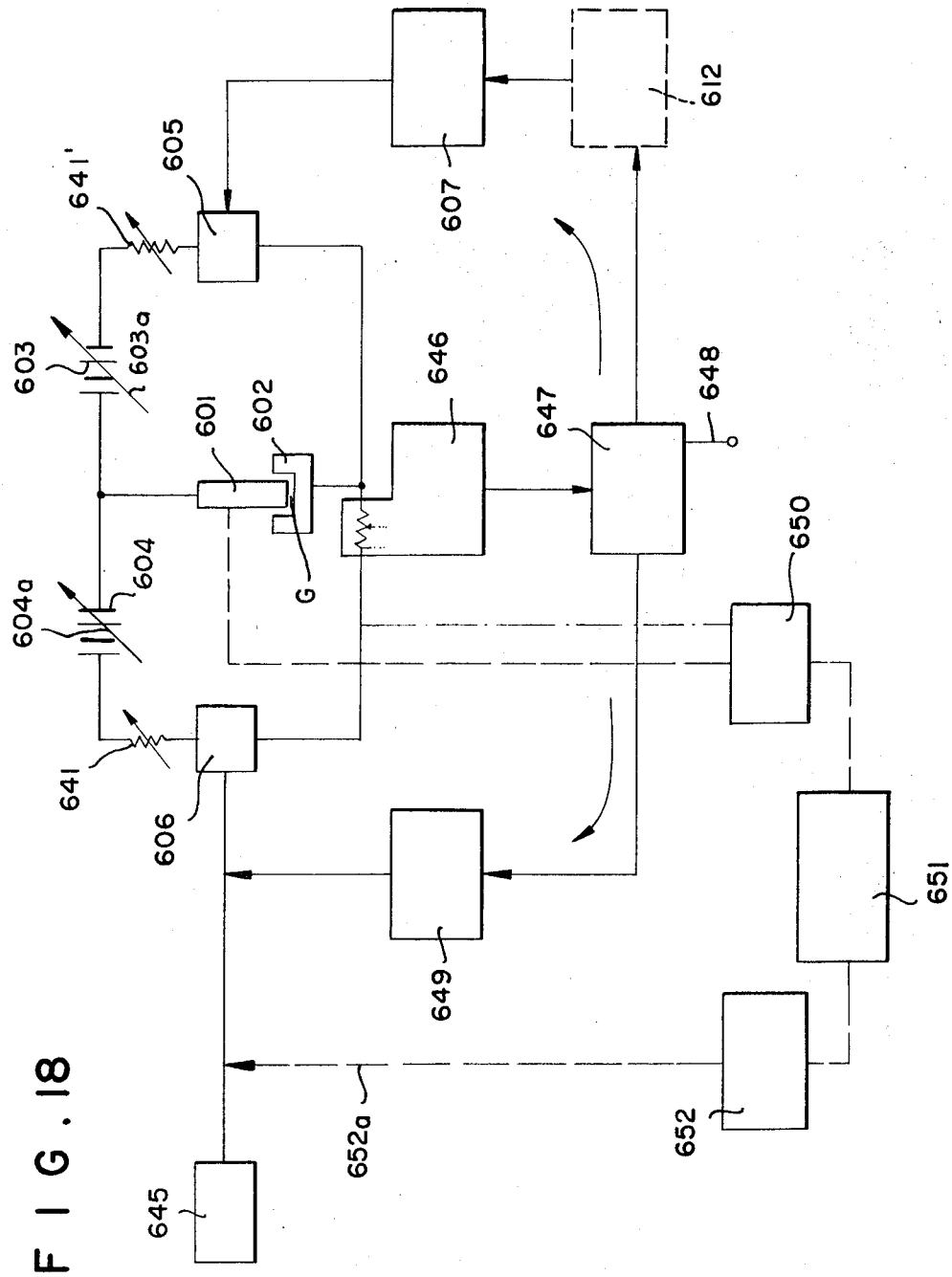
FIG. 18 is a block diagram illustrating another embodiment of the invention.
Figure 19:
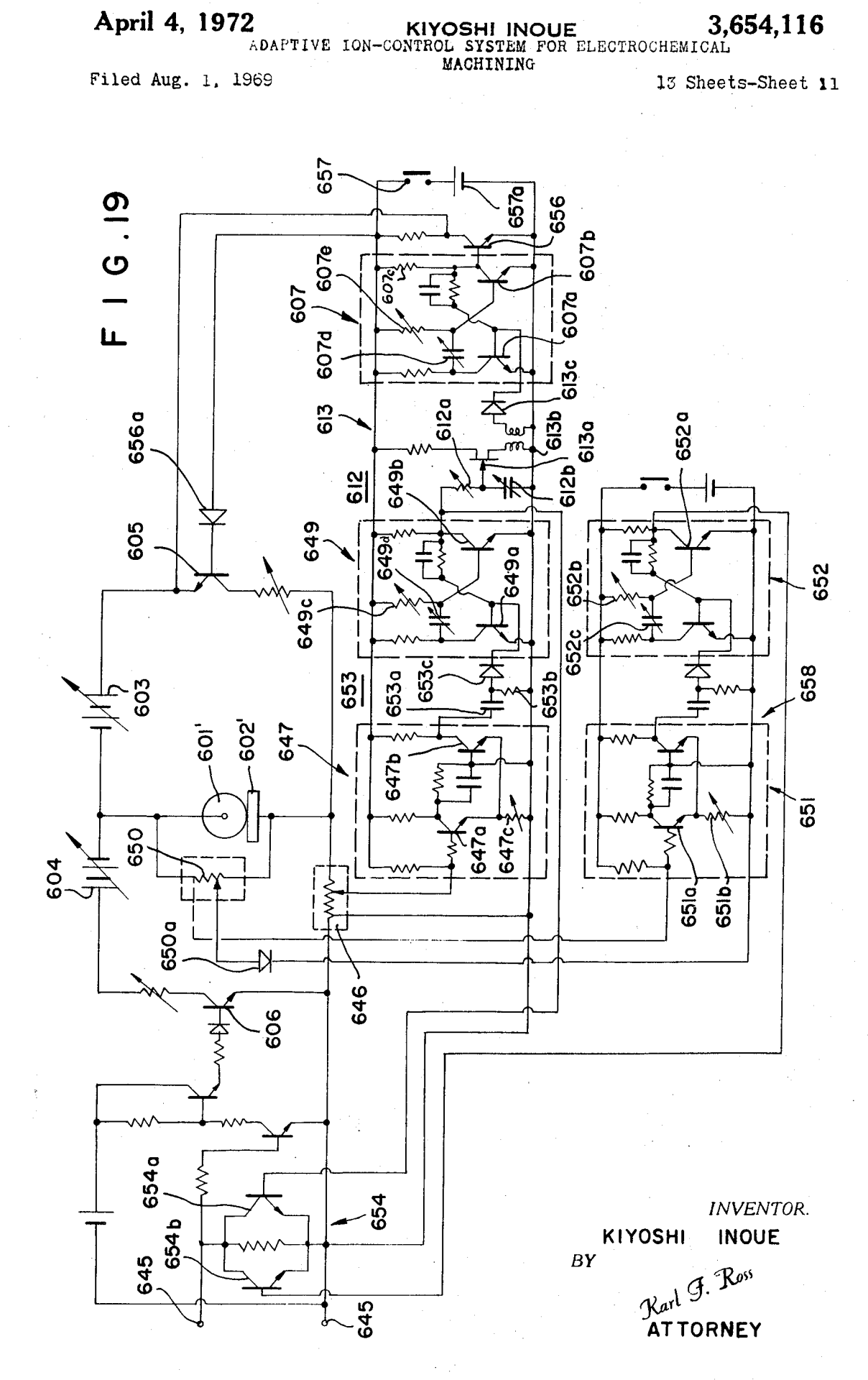

In FIGS. 18 and 19, there is shown a further development in adaptive control to obviate the effects of passivation. In this embodiment, the electrode $601$ is juxtaposed with the workpiece $602$ over the gap G, an electrolyte being circulated through a bore in the interior of the electrode $601$ in accordance with conventional procedures and the electrode being advanced by a servomechanism of known type. The positive or machining power source is here represented at $604$ and provides at $604a$ adjustable voltage control, i.e. the amplitude of the voltage directed by the source $604$ is regulatable. Similarly, a rheostat $641$ in series with the source $604$ controls the machining power current level of each pulse. In series with the source $604$, the current control $641$, the electrode $601$, the workpiece $602$ and the gap G is an electronic switch $606$ which may be of the type illustrated in FIG. 15A, the switch receiving its trigger signal as previously described. In addition, the negative voltage source $603$, which is of adjustable level as represented at $603a$ is connected across the workpiece $602$ and the electrode $601$ in series with the negative-pulse current control $641'$ and an electronic switch $605$ which may be of the type shown at FIG. 15A.

In accordance with an essential feature of this aspect of the invention, the power switch $606$ remains conductive as long as it receives a signal from a signal source $645$ which may deliver a direct current or a plurality of pulses, e.g. a multistable multivibrator as shown at $407a$ or $407b$. In the conductive condition of the switch $606$ and assuming continuous delivery of the "on" signal from source $645$, a unidirectional machining current from source $604$ continuously passes through the electrode/workpiece G to electrochemically erode the workpiece. As will be discussed in greater detail hereinafter, this power switch is substantially instantaneously or automatically blocked or rendered nonconductive when the machining gap tends to shift into an undesirable condition.

The switch $604$ responds to gap information to apply a negative pulse (reversal pulse) to the gap when information is drawn from the latter to indicate that passivation and/or contamination has built up above a critical level.

The gap-information network includes a gap detector $646$ which may be constituted as a resistor bridged across the electrode and the workpiece and from which a portion of the gap voltage is tapped (see FIG. 19). The gap detector $646$ may include a potentiometer connected in series with the main machining source $604$ and tapped to produce a signal voltage proportional to the amplitude of the machining current. The sensed current level is fed, in the form of this voltage signal, to a threshold temperature 647 which is represented at 648 as having a reference input. A suitable circuit is used as a compartor in accordance with the present invention is a Schmitt trigger in which one of the resistors of the input transistor is variable to set a threshold level.

In the Schmitt trigger, the voltage signal indicating machining current is compared with the threshold level and, upon buildup of passivation (with current decrease with increasing gap resistivity), a signal appears at the output of the comparator 648 to energize a trigger generator 649 to produce a control pulse of a predetermined duration. To this end, member 649 may be a multistable multivibrator having an adjustable time-constant network to establish the duration of the control pulse. The control signal is applied as the cut-off signal in backing relationship with the signal source 645 to the electronic power switch 606, thereby rendering ineffective the conducting signal from source 645.

Members 646, 647, 648 and 649 constitute a main current cut-off loop whereby passivation immediately results in termination of the machining pulse and a presetting of the machining pulse duration is not necessary and full adaptive control of the machining pulse is encompassed.

As soon as the threshold comparator 648 initiates termination of the main power pulse, it energizes via an optional delay network 612, a trigger generator 607 of the multistable multivibrator type described above to trigger a reverse-polarity pulse with an adaptively controlled duration determined by the degree of passivation as previously discussed. The trigger generator 607 retains the reverse-polarity switch 605 in a conductive condition until it is cut off. Members 646, 647, 612, 607 and 605 thus constitute a reverse-polarity (negative-pulse) loop.

In addition, the circuit of FIG. 18 includes a cut-off loop responding to short-circuiting of the gap to terminate the machining current flow In this arrangement, a further gap detector is provided, e.g. in the form of a resistor connected across the electrode 601 and the workpiece 602 and provided with voltage dividing taps. The passage of the potential across the gap to zero indicative of short-circuiting, is detected at 650 and operates a threshold temperature 651 which, in turn, operates the trigger generator 652 (multistable multivibrator) to produce a cut-off signal which is applied at 652a to the input of electronic switch 606 to nullify the signal delivered thereto at 645 and tending to hold the electronic switch in a conductive state.

In FIG. 19, this circuit is shown in somewhat greater detail. In this embodiment, the threshold comparator 647 comprises a pair of NPN transistors 647a and 647b in mutually conjugated conductive states and together constitute a Schmitt trigger as previously described. The reference level is established by the variable resistor 647c. As long as the gap current is above a critical level indicating that normal electrochemical machining is in progress, transistor 647a receives a potential between its base and emitter which reversely biases the latter to hold the transistor 647a nonconductive, the second transistor 647b is in a conductive state so that no output signal appears.

When, however, the gap current drops below a level such that the voltage applied by the potentiometer 646 to the input terminals of transistor of 647a falls to a level below the threshold established by resistor 647c, transistor 647a is rendered conductive and transistor 647b is blocked. When transistor 647b blocks, a potential develops across the output of this transistor which is picked up by a differentiation network 653 and consisting of a capacitor 653a in series with a resistor 653b across the collector and base of the transistor 646b, and a diode 653c connected between the junction of the capacitor 653a and resistor 653b and the base or control electrode of a transformer 649a of the multistable multivibrator constituting the trigger generator of the main current cut off loop.

A trigger pulse is thus applied to the base of the normally nonconductive NPN transistor 649a to render it conductive and simutaneously cut off a normally conductive NPN transistor 649b of this multistable multivibrator. A signal thus builds up across the extinguished transistor 649b and is applied to the control electrodes of a normally nonconductive transistor 654a of a balancing circuit or gate 654 in which any signal from the main control source 645 can be balanced or nullified. It will be apparent that, as transistor 648 becomes conductive, the output signal of source 645 is shunted, thereby cutting off the switching transistor 606. The cut-off period is determined by the time constant of the multivibrator 469 and can be adjusted by setting the resistor 469c or the capacitor 649d of the time constant network of this multivibrator. Thus the power switch 606 is clsed and the resumption of normal machining is possible only when transistor 649b returns to its conductive state.

As noted earlier, the output signal of the threshold comparator 647 is also employed to generate the negative pulse for removal of ion contamination and passivation film. The output signal from the trigger generator 649 is utilized to generate and/or determine the timing of the negative pulse. Thus an integrating network 612 may be provided across the transistor 649b to serve as a delay means insuring a fixed time lag, after cut off of machining current prior to the initiation of the reversal pulse.

The delay network is here shown to comprise a variable resistor 612a and a variable capacitor 612b connected across the emitter/collector network of transistor 649b. The output from the integrating circuit 612 is applied to a further differentiating network 613, the latter consisting of a unijunction transistor or double based diode 613a whose control and rectifying electrode is tied to a point between capacitor 612b and resistor 612a. The output from the unijunction 613a traverses the primary winding of a coupling transformer 614b the secondary of which is connected via a diode 613c with a transistor 607a of the multivibrator 670. The differentiating network 613 provides a positive trigger pulse to the base of transistor 607a to render the normally conductive output transistor 607b nonconductive, whereupon a negative signal is produced across the output resistor 607c which is applied to an amplifying transistor 656 which also serves as an inverter to produce the opposite polarity. Transistor 656, in turn, energizes the electronic switch 605 via a rectifier diode 656 to connect the source 603 across the workpiece and the electrode, here shown as an electrochemical grinding wheel 601' juxtaposed with the workpiece 602'. Electrolyte is, of course, fed to the gap as is conventional in electrochemical grinding operations. A switch 657 in series with a voltage source 657a for the transistors of circuit 647, 649, 613, 607, serves to turn on and off the apparatus. The negative or reverse current pulse is applied for a duration established by the time constant of the multivibrator 607 as set by the adjustable capacitor 607d and variable resistor 607e of the time constant network.

As can be seen from FIG. 20, the machining pulse $P_1$ is cut off at $t_1$ upon the development of passivation such that the current falls below a predetermined threshold. Simultaneously, in the absence of a delay network 612, the negative pulse $P_2$ is generated and terminates at $t_2$ to produce a further machining pulse $P_3$. The duration of the negative pulse is represented by $t_2-t_1$. This duration can be reduced (see graph $b$ of FIG. 2) and, by providing a delay prior to restoration of the decrease circuit 649, it is possible to introduce a lag $l$ between termination of the negative pulse and commencement of the next machining pulse $P_3$. The delay network 612 establishes the lag $l1$ prior to initiation of the negative $P_2$ in the graph $d$ of FIG. 20.

Reverting to FIG. 19, it can be seen that the short-circuited cut-off loop includes a tap resistor 650 connected across the workpiece and the tool electrode and sensing a gap voltage. The output signal is drawn from the taps of the voltage divider 650 and is applied via the rectifier diode 650a to the Schmitt-trigger comparator 651 at its first transistor 651a. The threshold-setting resistor 651b establishes a reference level such that, only when the gap voltage falls below a critical level indicating a short-circuited condition, is a triggered pulse produced to operate the multistable multivibrator 652 via a differentiation circuit 658 as described in connection with the circuits 647, 649 and 612. The output of transistor 652a is applied to the transistor 654b of the shut circuit to cut off "on" signal normally delivered to the machining switch 606. The time-constant network 652b, 652c establishes the duration of cut off it should be sufficient long to enable the operator to eliminate the danger. The output of multivibrator 652 may also be used if desired to trigger multivibrator 607 and produce the negative pulse to eliminate pseudo short-circuiting as results with continuous constant-rate feed of the electrode at development of passivation films and reduces the effective gap width to the short-circuiting level.

In FIG. 21, there is shown an adaptive control system of an electrochemical machining utilizing as an input, variations in electrolyte feed or rate. In this system, the electrode 701 is juxtaposed with the workpiece 702 across the machining gap G while electrolyte is supplied to the gap through the interior of the tool electrode by a light 760, a pump 761 and a reservoir 762. Excess electrolyte beyond the maximum throughput of the gap is bypassed through a relief valve 761a to the reservoir 762 through a line 761b provided with a rate generator rotor 763a. The rate generator 763a is responsive to the flow rate of electrolyte bypassed to the reservoir.

This aspect of the invention is based upon the discovery that under constant power feed of electrolyte with normal electrochemical machining, the circulated electrolyte pressure at the machining gap remains constant and accordingly the rate of displacement of the rotor 763a is constant and below, for example a threshold level. The electrolyte pressure increases at the gap whenever the gap is reduced under constant power feed as a result of excessive development of the passivation film or ion contamination. As a result, the flow rate in the bypass increases and is sensed by the rate generator 763. The voltage output of the rate generator is balanced against a reference 764 so that an output appears at the terminals 765 only when the gap condition indicates detrimental passivation.

In FIG. 17, there is shown a multivibrator in which the resistor of the time-constant network controls the duration of the depassivation or reverse polarity pulse. In that case, the resistor is constituted as a photoelectric transducer and is controlled by an external source responsive to the gap conditions, as determined by electrode feed.

The circuit of FIG. 21 is equally applicable and the terminal 765 need merely be connected across a lamp $701c^5$, for example, as shown in FIG. 21A, wherein the cadmium sulfide cell is shown at 735. In a modification of this circuit, the cadmium sulfide cell may be replaced by a transistor which as shown in FIG. 21B at 735a functions as a variable resistor controlled by the potential across its base-emitter electrodes. The terminals 765 are then applied to base-emitter electrode of this transistor. In FIG. 21C, there is shown a modification in which the time constant capacitor 534 of the multivibrator controlling the duration of the reverse polarity pulses is replaced by a varactor 634, the terminal 765 being connected across the latter to adjust the time constant and, therefore, the duration of the machining pulses.

Figure 22:
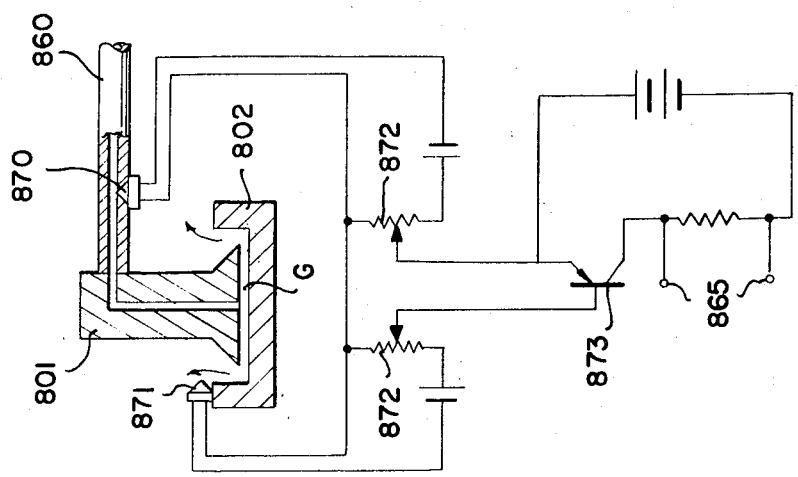
FIG. 22 is a system representing adaptive control and using thermal detection of a flow parameter to respond to the passivation film.

It has been mentioned earlier that other parameters of the electrolyte flow may be used to a similar end and in FIG. 22, it is shown how the terminal condition of the electrolyte may be employed. The electrolyte is circulated through the electrode 801 to the gap G between it and the workpiece 802 via line 860 and a thermistor 870 senses the temperature of the incoming electrolyte. The electrolyte leaving the gap at a higher temperature contact a further thermistor 871 so that, via the series resistances 872 of the thermistor circuits, an output may be obtained which represents the differential temperature. Since the differential temperature is a function of the gap dimensions with constant feed of the electrode, a transistor 873 may be rendered conductive to an extent determined by the temperature differential and may be used as shown in FIGS. 21A, and 21B and 21C to provide, via its output terminals 865, the control signal required for establishing the duration of the negative machining pulses.

Figure 23:
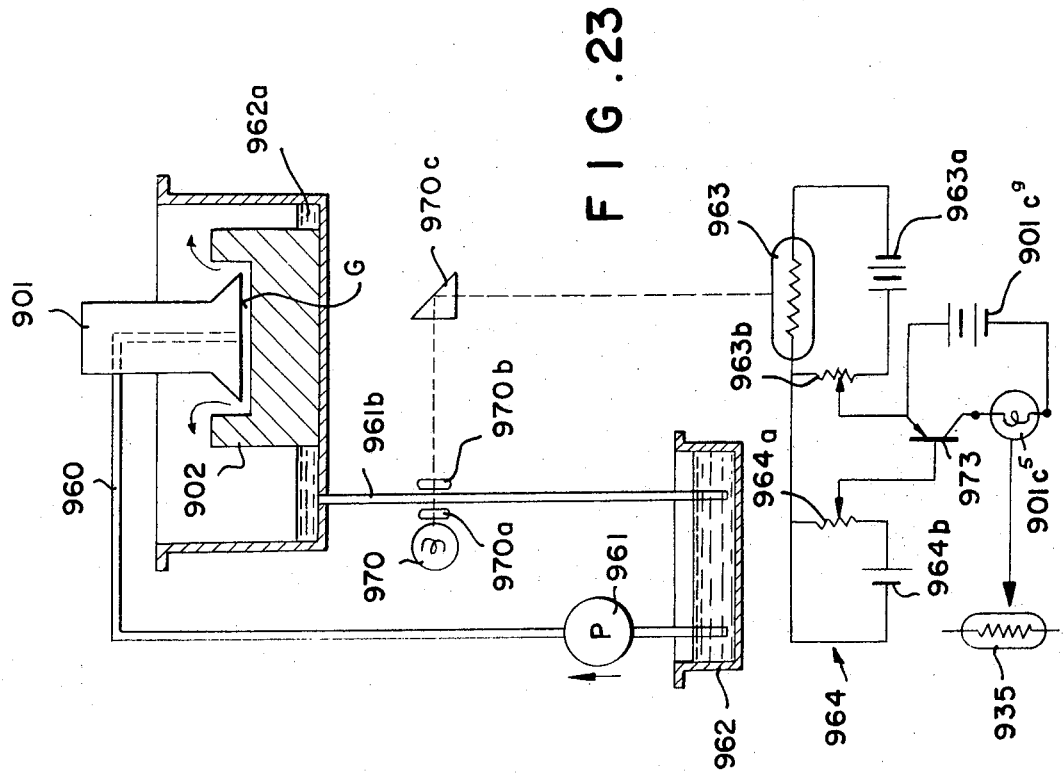
FIG. 23 is a system for adaptive control using the optimal characteristics of the electrolyte to adjust a pulse parameter in accordance with this invention.

In FIG. 23, there is shown an arrangement in which optical characteristics of the electrolyte are used for control purposes. In this embodiment, the electrode 901 receives the electrolyte from line 960 via a pump 961, the electrolyte being collected at 962a after overflowing from the gap G between electrode 901 and workpiece 902. A return line 961b leads from the collecting trough 962a to the reservoir 962. A section of the line 961b is translucent and on one side is provided a lamp 970 with a lens system 970a. A pick-up lens 970b on the other side of the translucent electrolyte duct directs transmitted light to a prism 970c from which it is trained upon a cadmium sulfide photoconductor 963. The latter is in series with a direct current source 963a and a voltage dividing potentiometer 963b, the tap of which is connected to a transistor 973 at its emitter. The base electrode of the transistor 973 is tied to the wiper of the potentiometer 964a of a reference network 964. A battery 964b lies in series with potentiometer 964a. This system is based upon the discovery that as the gap effectively changes as a result of passivation film, etc., the opacity or transparency of the electrolyte varies in substantially direct relation. Accordingly, any change in the gap condition is reflected in a change in the light transmissivity and, therefore, in the conductivity of the transistor 973, the intensity of the lamp $901c^5$ in series with this transistor and a direct current source $901c^9$ and in the conductivity of a photoconductor 935 in the pulse-duration determining network of the multistable multivibrator.

In FIG. 21, the circuit for producing the positive and negative pulses is shown in blocked diagrammatic form it being noted that any of the circuits previously described may be used for this purpose. The same holds true for the embodiments of FIGS. 22 and 23. Conversely, the control systems using electrolyte parameters of FIGS. 21–23 are equally applicable in all of the previously described systems individually or together.

I claim:
1. In an apparatus for electrochemically machining a conductive workpiece wherein a tool electrode is juxtaposed with said workpiece and including means for supplying electrolyte to confronting surfaces of the electrode and the workpiece, and means for relatively displacing the electrode and the workpiece transversely to said surface, the improvement which comprises:
   a first source of electric current connectable across said workpiece and said tool electrode in a single electrolyte-gap circuit for applying machining-current pulses of one polarity to the workpiece and the electrode for electrochemically eroding the workpiece in the presence of said electrolyte;
   a second source of reverse-polarity electric current connectable across said electrode and the workpiece in a single electrolyte-gap circuit for supplying thereto reverse-polarity pulses of a polarity opposite that of said machining-current pulses; and
   switch means for cutting off said first source, connecting said second source and reconnecting said first source across said electrode and said workpiece in repetitive succession to apply discrete opposite polar- ity pulses in intervals between discrete machining-current pulses.

2. The improvement defined in claim 1 wherein said second source has a current amplitude in excess of that of said first source and said switch means superimposes said opposite-polarity pulses upon a continuous current delivered by said first source across said electrode and said workpiece.

3. The improvement defined in claim 1 wherein at least one of said sources includes a direct-current supply; and a solid-state electronic switch connected in series with said supply, said electrode and said workpiece.

4. The improvement defined in claim 3 wherein said switch means includes means for periodically triggering said electronic switch.

5. The improvement defined in claim 4 wherein said switch means includes a transistor multivibrator.

6. The improvement defined in claim 4 wherein said electronic switch is a solid-state controlled rectifier.

7. The improvement defined in claim 3 wherein said electronic switch is a bank of parallel-connected transistors, the number of transistors connected in said bank and in circuit with said supply, said electrode and said workpiece determining the peak current traversing said electrode and said workpiece.

8. The improvement defined in claim 3 wherein the other of said sources comprises a second solid-state electronic switch and a supply of direct current connected in series with said electrode and said workpiece, said switch means alternately triggering said electronic switches.

9. The improvement defined in claim 8 wherein each of said electronic switches includes a respective pair of solid-state controlled rectifiers in series with said electrode and said workpiece.

10. The improvement defined in claim 8 wherein each of said electronic switches includes a multiplicity of similar transistors with emitter-collector network connected in parallel with one another and jointly in series with said electrode and said workpiece.

11. The improvement defined in claim 8, further comprising adjustable time-delay means between said switch means and one of said electronic switches for triggering the latter only upon the lapse of a predetermined interval after decay of a pulse produced by the conduction of the other electronic switch.

12. The improvement defined in claim 11 wherein said adjustable time-delay means includes a unijunction-transistor circuit for establishing the pulse width of at least one of the sets of pulses produced by said electronic switches.

13. The improvement defined in claim 8 wherein at least one of said electronic switches includes pulse-shaping means for modifying the voltage envelope of the respective pulse waveform to maintain the current flow through said electrode and said workpiece substantially constant during the respective pulse.

14. The improvement defined in claim 8, further comprising feedback means responsive to at least one electrical parameter of the machining current as applied across said electrode and said workpiece for automatically controlling said intervals.

15. The improvement defined in claim 1, further comprising means responsive to a condition of the machining gap between said electrode and said workpiece for terminating a machine-current pulse and initiating an opposite-polarity current pulse.

16. The improvement defined in claim 15 wherein electrolyte is recirculated through said gap, said means responsive to said condition including temperature-sensitive means responsive to the electrolyte temperature prior to entry of the electrolyte into the gap and upon emergence of the electrolyte therefrom and operatively connected to said switch means for controlling same.

17. The improvement defined in claim 15 wherein an electrolyte is continuously recirculated through said gap, said means responsive to said condition including optical means sensitive to changes in an optical property of said electrolyte and exposed thereto upon its emergence from said gap for controlling said switch means.

18. The improvement defined in claim 15 wherein electrolyte is continuously fed under pressure to said gap, said means responsive to said condition including means sensitive to a flow parameter of said electrolyte operatively connected to said switch means for controlling same.

19. The improvement defined in claim 15 wherein said means responsive to said condition includes current responsive means in circuit with said first source for controlling said switch means.

20. The improvement defined in claim 15 wherein:
said means responsive to said condition includes first and second detector means connected across said electrode and said workpiece and respectively generating control signals upon the decay of said machining current pulses and the decay of said opposite-polarity current pulses respectively;
said switch means includes:
first and second waveshapers respectively connected to said first and second detector means for producing output waveforms,
first and second differentiating circuits respectively energized by said waveshapers and producing respective trigger signals upon the decay of said machining-current and opposite-polarity pulses respectively, and
first and second monostable multivibrators respectively connected to the electronic switch of said first source and the electronic switch of said second source,
said first differentiator triggers said second multibrator and said second differentiator triggering said first multivibrator upon the decay of said machining current pulses and said opposite-polarity pulses respectively to initiate the alternating pulse.

21. The improvement defined in claim 20, further comprising an adjustable time-delay network connected between one of said detector means and the associated waveshaper.

22. The improvement defined in claim 21 wherein an adjustable delay network is connected between each of said detector means and the associated waveshaper.

23. The improvement defined in claim 20 wherein said waveshapers are Schmitt triggers.

24. The improvement defined in claim 20 wherein said multivibrators have adjustable time constants for establishing the polarities of the durations of said machining-current and opposite-polarity pulses.

25. The improvement defined in claim 24, further comprising means responsive to a parameter of the gap and connected to the multivibrator establishing the duration of each of said opposite-polarity pulses for increasing said duration upon increasing passivation of said gap and vice versa.

26. The improvement defined in claim 25 wherein said electrode and said workpiece are relatively displaced transversely to said surface by a servomechanism tending to maintain the gap width substantially constant, said means responsive to the rate of relative displacement of said electrode and said workpiece and operatively connected to the last-mentioned multivibrator for establishing the duration of said opposite polarity-pulses.

27. The improvement defined in claim 25 wherein said workpiece and said electrode are relatively displaced at a substantially constant rate, said means responsive to said parameter including at least one of the following means connected to the last-mentioned multivibrator for varying the time constant thereof in accordance with gap passivation:
(a) means responsive to gap voltage connected across said electrode and said workpiece;

(b) means responsive to gap current connected in series with said first source;

(c) means responsive to the temperature increases of electrolyte traversing said gap;

(d) means responsive to an optical property of the electrolyte emerging from said gap; and (e) means responsive to the flow rate of electrolyte to said gap.

28. The improvement defined in claim 20, further comprising means responsive to incipient short circuiting of the gap between said electrode and said workpiece for cutting off said first source.

29. The improvement defined in claim 28, further comprising a control-signal source connected to the electronic switch of said first source for operating same, said means responsive to said incipient short circuting including trigger means for applying to said switch a nullification signal rendering ineffective the control signal at said first source.

References Cited
UNITED STATES PATENTS

| | | | |
|---|---|---|---|
| 3,466,235 | 9/1969 | Williams | 204—224 X |
| 3,288,693 | 11/1966 | Livshits | 204—224 X |
| 3,407,125 | 10/1968 | Fehlner | 204—228 X |
| 3,202,599 | 8/1965 | Schierholt | 204—224 |
| 3,075,902 | 1/1963 | Bradley et al. | 204—228 X |

JOHN H. MACK, Primary Examiner

R. J. FAY, Assistant Examiner

U.S. Cl. X.R.

204—143 M, 228, DIG. 8